(12) United States Patent
Price et al.

(10) Patent No.: US 11,962,922 B2
(45) Date of Patent: Apr. 16, 2024

(54) SYSTEMS AND METHODS FOR DARK CURRENT COMPENSATION IN SINGLE PHOTON AVALANCHE DIODE IMAGERY

(71) Applicant: Microsoft Technology Licensing, LLC, Redmond, WA (US)

(72) Inventors: Raymond Kirk Price, Carnation, WA (US); Michael Bleyer, Seattle, WA (US); Christopher Douglas Edmonds, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/318,533

(22) Filed: May 16, 2023

(65) Prior Publication Data

US 2023/0292022 A1    Sep. 14, 2023

Related U.S. Application Data

(63) Continuation of application No. 17/334,618, filed on May 28, 2021, now Pat. No. 11,696,049.

(51) Int. Cl.
| | |
|---|---|
| *H04N 5/335* | (2011.01) |
| *G06T 3/40* | (2006.01) |
| *H04N 25/46* | (2023.01) |
| *H04N 25/63* | (2023.01) |

(52) U.S. Cl.
CPC ............... *H04N 25/63* (2023.01); *G06T 3/40* (2013.01); *H04N 25/46* (2023.01)

(58) Field of Classification Search
CPC .................................................... H04N 25/63
See application file for complete search history.

(56) References Cited

U.S. PATENT DOCUMENTS

| | | | |
|---|---|---|---|
| 11,711,628 B2* | 7/2023 | Price | H04N 25/76 |
| | | | 348/207.99 |
| 2008/0166043 A1 | 7/2008 | Bassi | |
| 2020/0043141 A1 | 2/2020 | Lin | |
| 2023/0117006 A1* | 4/2023 | Price | H04N 25/673 |
| | | | 348/243 |
| 2023/0300483 A1 | 9/2023 | Price et al. | |

OTHER PUBLICATIONS

U.S. Appl. No. 17/334,618, filed May 28, 2021.

(Continued)

*Primary Examiner* — Gary C Vieaux
(74) *Attorney, Agent, or Firm* — Workman Nydegger

(57) ABSTRACT

A system for dark current compensation in SPAD imagery is configurable to capture an image frame with the SPAD array and generate a temporally filtered image by performing a temporal filtering operation using the image frame and at least one preceding image frame. The at least one preceding image frame is captured by the SPAD array at a timepoint that temporally precedes a timepoint associated with the image frame. The system is also configurable to obtain a dark current image frame. The dark current image frame includes data indicating one or more SPAD pixels of the plurality of SPAD pixels that detect an avalanche event without detecting a corresponding photon. The system is also configurable to generate a dark current compensated image by performing a subtraction operation on the temporally filtered image or the image frame based on the dark current image frame.

20 Claims, 24 Drawing Sheets

(56) References Cited

OTHER PUBLICATIONS

U.S. Appl. No. 17/334,635, filed May 28, 2021.
U.S. Appl. No. 18/324,805, filed May 26, 2023.
Non-Final Office Action mailed on Jan. 3, 2024, in U.S. Appl. No. 18/324,805, 17 Page.
Office Action Received for European Application No. 22714060.5, mailed on Jan. 9, 2024, 3 pages.

* cited by examiner

1300

SYSTEMS AND METHODS FOR DARK CURRENT COMPENSATION IN SINGLE PHOTON AVALANCHE DIODE IMAGERY

CROSS-REFERENCE TO RELATED APPLICATIONS

This application is a continuation of U.S. patent application Ser. No. 17/334,618, filed on May 28, 2021, and entitled "SYSTEMS AND METHODS FOR DARK CURRENT COMPENSATION IN SINGLE PHOTON AVALANCHE DIODE IMAGERY," the entirety of which is incorporated herein by reference.

BACKGROUND

Mixed-reality (MR) systems, including virtual-reality and augmented-reality systems, have received significant attention because of their ability to create truly unique experiences for their users. For reference, conventional virtual-reality (VR) systems create a completely immersive experience by restricting their users' views to only a virtual environment. This is often achieved, in VR systems, through the use of a head-mounted device (HMD) that completely blocks any view of the real world. As a result, a user is entirely immersed within the virtual environment. In contrast, conventional augmented-reality (AR) systems create an augmented-reality experience by visually presenting virtual objects that are placed in or that interact with the real world.

As used herein, VR and AR systems are described and referenced interchangeably. Unless stated otherwise, the descriptions herein apply equally to all types of mixed-reality systems, which (as detailed above) includes AR systems, VR reality systems, and/or any other similar system capable of displaying virtual objects.

Some MR systems include one or more cameras for facilitating image capture, video capture, and/or other functions. For instance, cameras of an MR system may utilize images and/or depth information obtained using the camera(s) to provide pass-through views of a user's environment to the user. An MR system may provide pass-through views in various ways. For example, an MR system may present raw images captured by the camera(s) of the MR system to a user. In other instances, an MR system may modify and/or reproject captured image data to correspond to the perspective of a user's eye to generate pass-through views. An MR system may modify and/or reproject captured image data to generate a pass-through view using depth information for the captured environment obtained by the MR system (e.g., using a depth system of the MR system, such as a time-of-flight camera, a rangefinder, stereoscopic depth cameras, etc.). In some instances, an MR system utilizes one or more predefined depth values to generate pass-through views (e.g., by performing planar reprojection).

In some instances, pass-through views generated by modifying and/or reprojecting captured image data may at least partially correct for differences in perspective brought about by the physical separation between a user's eyes and the camera(s) of the MR system (known as the "parallax problem," "parallax error," or, simply "parallax"). Such pass-through views/images may be referred to as "parallax-corrected pass-through" views/images. By way of illustration, parallax-corrected pass-through images may appear to a user as though they were captured by cameras that are co-located with the user's eyes.

A pass-through view can aid users in avoiding disorientation and/or safety hazards when transitioning into and/or navigating within a mixed-reality environment. Pass-through views may also enhance user views in low visibility environments. For example, mixed-reality systems configured with long wavelength thermal imaging cameras may facilitate visibility in smoke, haze, fog, and/or dust. Likewise, mixed-reality systems configured with low light imaging cameras facilitate visibility in dark environments where the ambient light level is below the level required for human vision.

To facilitate imaging of an environment for generating a pass-through view, some MR systems include image sensors that utilize complementary metal-oxide-semiconductor (CMOS) and/or charge-coupled device (CCD) technology. For example, such technologies may include image sensing pixel arrays where each pixel is configured to generate electron-hole pairs in response to detected photons. The electrons may become stored in per-pixel capacitors, and the charge stored in the capacitors may be read out to provide image data (e.g., by converting the stored charge to a voltage).

However, such image sensors suffer from a number of shortcomings. For example, the signal to noise ratio for a conventional image sensor may be highly affected by read noise, especially when imaging under low visibility conditions. For instance, under low light imaging conditions (e.g., where ambient light is below about 10 lux, such as within a range of about 1 millilux or below), a CMOS or CCD imaging pixel may detect only a small number of photons, which may cause the read noise to approach or exceed the signal detected by the imaging pixel and decrease the signal-to-noise ratio.

The dominance of read noise in a signal detected by a CMOS or CCD image sensor is often exacerbated when imaging at a high frame rate under low light conditions. Although a lower framerate may be used to allow a CMOS or CCD sensor to detect enough photons to allow the signal to avoid being dominated by read noise, utilizing a low framerate often leads to motion blur in captured images. Motion blur is especially problematic when imaging is performed on an HMD or other device that undergoes regular motion during use.

In addition to affecting pass-through imaging, the read noise and/or motion blur associated with conventional image sensors may also affect other operations performed by HMDs, such as late stage reprojection, rolling shutter corrections, object tracking (e.g., hand tracking), surface reconstruction, semantic labeling, 3D reconstruction of objects, and/or others.

To address shortcomings associated with CMOS and/or CCD image sensors, devices have emerged that utilize single photon avalanche diode (SPAD) image sensors. In contrast with conventional CMOS or CCD sensors, a SPAD is operated at a bias voltage that enables the SPAD to detect a single photon. Upon detecting a single photon, an electron-hole pair is formed, and the electron is accelerated across a high electric field, causing avalanche multiplication (e.g., generating additional electron-hole pairs). Thus, each detected photon may trigger an avalanche event. A SPAD may operate in a gated manner (each gate corresponding to a separate shutter operation), where each gated shutter operation may be configured to result in a binary output. The binary output may comprise a "1" where an avalanche event was detected during an exposure (e.g., where a photon was detected), or a "0" where no avalanche event was detected. Separate shutter operations may be performed consecutively and integrated over a frame capture time period. The binary output of the consecutive shutter operations over a frame capture time period may be counted, and an intensity value may be calculated based on the counted binary output.

An array of SPADs may form an image sensor, with each SPAD forming a separate pixel in the SPAD array. To capture an image of an environment, each SPAD pixel may detect avalanche events and provide binary output for consecutive shutter operations in the manner described herein. The per-pixel binary output of consecutive shutter operations over a frame capture time period may be counted, and per-pixel intensity values may be calculated based on the counted per-pixel binary output. The per-pixel intensity values may be used to form an intensity image of an environment.

Although SPAD sensors show promise for overcoming various shortcomings associated with CMOS or CCD sensors, implementing SPAD sensors for image and/or video capture is still associated with many challenges. For example, there is an ongoing need and desire for improvements to the image quality of SPAD imagery, particularly for SPAD imagery captured under low light conditions (including color imagery capturing using SPADs under low light conditions).

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include systems, methods, and devices for dark current compensation in SPAD imagery.

Some disclosed systems include a SPAD array with a plurality of SPAD pixels. The systems also include one or more processors and one or more hardware storage devices storing instructions that are executable by the one or more processors to configure the system to perform various acts associated with performing dark current compensation in SPAD imagery. These acts include capturing an image frame with the SPAD array and generating a temporally filtered image by performing a temporal filtering operation using the image frame and a preceding image frame captured by the SPAD array at a timepoint that temporally precedes a timepoint associated with the image frame.

The disclosed acts for performing dark current compensation in SPAD imagery also include obtaining a dark current image frame that includes data indicating one or more SPAD pixels of the plurality of SPAD pixels have detected an avalanche event without detecting a corresponding photon.

The disclosed acts for performing dark current compensation in SPAD imagery also include generating a dark current compensated image by performing a subtraction operation on the temporally filtered image based on the dark current image frame.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
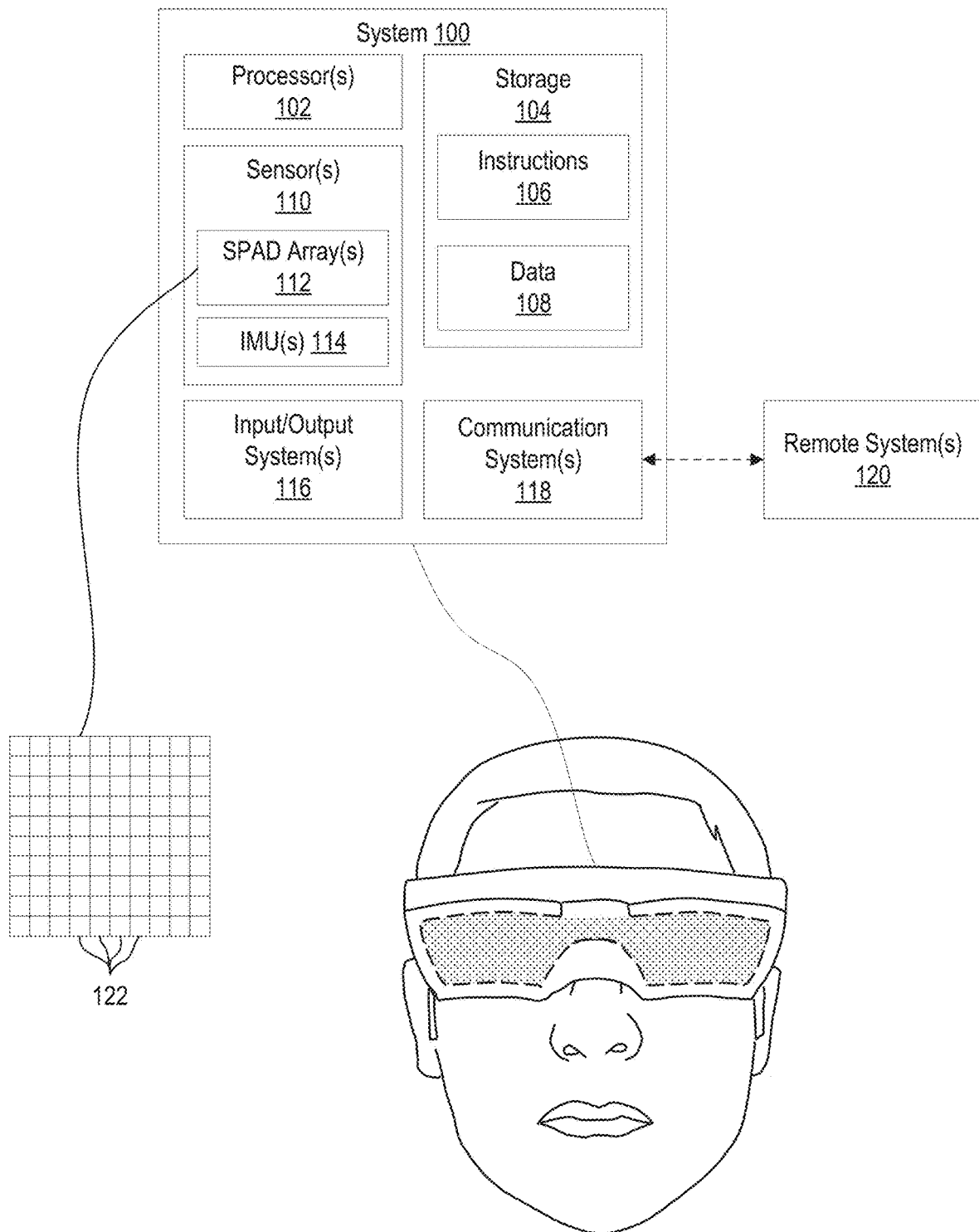
FIG. 1 illustrates example components of an example system that may include or be used to implement one or more disclosed embodiments.

Disclosed embodiments are generally directed to systems, methods, and devices for compensating for dark current in single photon avalanche diode (SPAD) imagery.

Examples of Technical Benefits, Improvements, and Practical Applications

Those skilled in the art will recognize, in view of the present disclosure, that at least some of the disclosed embodiments may be implemented to address various shortcomings associated with at least some conventional image acquisition techniques. The following section outlines some example improvements and/or practical applications provided by the disclosed embodiments. It will be appreciated, however, that the following are examples only and that the embodiments described herein are in no way limited to the example improvements discussed herein.

The techniques described herein may facilitate a number of advantages over conventional systems, devices, and/or methods for SPAD image acquisition (including color image acquisition), particularly for imaging under low light conditions and/or for imaging from devices that undergo motion during image capture (e.g., HMDs).

Initially, the binarization of the SPAD signal effectively eliminates read noise, thereby improving signal-to-noise ratio for SPAD image sensor arrays as compared with conventional CMOS and/or CCD sensors. Accordingly, because of the binarization of SPAD signal, a SPAD signal may be read out at a high framerate (e.g., 90 Hz or greater, such as 120 Hz or even 240 Hz) without causing the signal to be dominated by read noise, even for signals capturing a low number of photons under low light environments.

In view of the foregoing, multiple exposure (and readout) operations may be performed at a high framerate using a SPAD array to generate separate partial image frames, and these image frames may be temporally filtered with one another. The separate partial image frames may be aligned using motion data and combined (e.g., by averaging or other filtering) to form a single composite image. In this regard, SPAD images may be obtained in a temporally filtered manner (e.g., with persistence), using prior-timepoint image data to improve the quality of current-timepoint image data. In contrast, attempting to utilize multiple image frames captured a high framerate to form a single composite image using a conventional CMOS or CCD camera would result in signals dominated by read noise, particularly under low light imaging conditions.

An additional challenge associated with image acquisition using SPADs is signal noise brought about by dark current. Dark current (sometimes referred to as reverse bias leakage current) refers to a small electric current that flows through photosensitive devices (e.g., SPADs) even when no photons are entering the device. Dark current can be thermally induced or brought about by crystallographic and/or manufacturing irregularities and/or defects.

In SPADs, dark current can cause an electron-hole pair to be generated in the depletion region and can trigger avalanche events, even when the SPAD is not detecting a photon. Avalanche events brought about by dark current are typically counted as detected photons, which can cause the binary output of a SPAD to include false counts (or "dark counts"). In SPAD imagery, dark counts can cause the intensity values assigned to at least some SPAD pixels to be inaccurately high, which can add noise to SPAD imagery. In some instances, the effects of dark counts are prominent when imaging under low light conditions, resulting in high-frequency noise that degrades user experiences.

Accordingly, disclosed techniques may facilitate dark current compensation by subtracting a dark current SPAD image from a SPAD image captured at runtime. A dark current image may be obtained as part of a calibration step by capturing one or more SPAD images while blocking or occluding the SPAD sensor. The dark current image may indicate which SPAD pixels generate dark counts and/or the quantity of dark counts generated by different SPAD pixels. The dark current image may therefore be used to subtract dark counts from SPAD imagery captured at runtime to compensate for the effects of dark current in the SPAD sensor. Such subtraction may reduce the amount of noise present in SPAD imagery, thereby improving user experiences.

Where temporal filtering is included in a processing pipeline for generating SPAD imagery, it has been found to be advantageous to perform temporal filtering prior to performing dark current compensation. Stated differently, it has been found to be advantageous to perform dark current compensation on temporally filtered images, rather than to perform temporal filtering on dark current-compensated images. For example, because intensity values stored for images truncate at zero (e.g., negative intensity values are not stored), performing dark current subtraction before performing temporal filtering can generate a bias toward larger intensity values. Such biasing toward higher intensity values may occur, for example, where a dark current image stores a higher intensity value for a SPAD pixel than an intensity value detected by the SPAD pixel at runtime. In such cases, a subtraction operation will bring the intensity value for the SPAD pixel to zero, but the further difference between the higher dark current intensity value and the lower runtime intensity value will be lost. Accordingly, if temporal filtering is subsequently performed, the intensity value for the SPAD pixel may be higher than desired for effectively removing the dark counts.

Thus, in some instances, temporal filtering and dark current compensation may be performed in a particular order (with temporal filtering occurring first) to facilitate improved image acquisition using SPADs (e.g., with reduced noise), particularly for imaging under low light conditions. That said, in some instances, dark current compensation is performed prior to temporal filtering.

Additional challenges are associated with acquiring color images using SPADs, particularly under low light imaging conditions. For example, to capture color images, color filters are positioned over SPAD pixels (red, green, blue (RGB) color filters, or other types of filters) in a pattern (e.g., a Bayer pattern or other type of pattern) to collect light of different wavelengths to generate color values for image pixels of a color image. To generate color values, conventional systems obtain raw image data (e.g., per-pixel counts of avalanche events, or per-pixel intensity values based on the counts of avalanche events) and then perform a demosaicing operation on the raw image data. Demosaicing involves generating (e.g., via interpolation) per-pixel color values (e.g., RGB values) for each image sensing pixel of an image sensor (even though each image sensing pixel typically includes a filter for only a single color channel positioned thereover). Demosaicing may allow a color image to match the resolution of the image sensor, which is preferable, in some instances, relative to generating single color values (e.g., RGB values) for each cluster of color filtered image sensing pixels (e.g., each 2×2 set of a red pixel, a green pixel, a green pixel, and a blue pixel in a Bayer pattern). The latter approach results in downsampling or downscaling of the color image relative to the image sensor.

Under low light imaging conditions, raw image data captured by color filtered SPAD sensors often include significant noise. Furthermore, demosaicing operations are associated with adding noise to processed images, which further compounds the noise problem when using SPADS to perform color imaging under low light conditions.

Although temporal and spatial filtering operations may ordinarily reduce noise in SPAD imagery, such techniques are, in many instances, not well-suited for reducing noise in demosaiced SPAD imagery. For instance, noise added to the image data via demosaicing often reduces the effectiveness of such filtering operations for improving color imagery captured using SPADs.

Accordingly, disclosed techniques may facilitate reduced noise in color images acquired using SPADS by performing filtering operations (e.g., temporal filtering and/or spatial filtering) on raw image data captured using SPADS with color filters positioned thereover. In accordance with the present disclosure, raw image data is filtered to generate a filtered image, and demosaicing is subsequently performed on the filtered image (rather than on the raw image data). By performing demosaicing after one or more filtering operations, embodiments of the present disclosure refrain from further adding noise to the raw image data (e.g., as a result of demosaicing) prior to performing the filtering operations, thereby improving the benefits facilitated by the filtering operations and improving color image acquisition using SPADS.

Disclosed embodiments also extend to performing filtering operations (e.g., temporal and/or spatial filtering) in a manner that accounts for different color filters associated with different SPAD pixels of a SPAD sensor. For example, as noted above, temporal filtering can include aligning consecutively acquired image frames and filtering aligned image pixels together to generate a final image. However, for demosaiced images, different image pixels that become filtered together may be associated with different color channels (e.g., where large amounts of motion are associated with the consecutively acquired images), which can distort colors and/or intensities within the output image. Furthermore, spatial filtering can cause neighboring pixels of different color channels to become filtered together, which may distort colors and/or intensities within the output image.

To combat these issues, raw image data captured using color filtered SPADs may be demultiplexed to separate the image data into separate images associated with the different color channels represented by the color filters of the SPADs. Separate filtering operations (e.g., temporal and/or spatial filtering operations) may then be performed on the separate images associated with the different color channels, and, after filtering, the separate images may be recombined (e.g., multiplexed) into a single image and subsequently demosaiced to provide a final color image.

Having just described some of the various high-level features and benefits of the disclosed embodiments, attention will now be directed to FIGS. 1 through 22. These Figures illustrate various conceptual representations, architectures, methods, and supporting illustrations related to the disclosed embodiments.

Example Systems and Techniques for Dark Current Compensation in SPAD Imagery

Attention is now directed to FIG. 1, which illustrates an example system 100 that may include or be used to implement one or more disclosed embodiments. FIG. 1 depicts the system 100 as a head-mounted display (HMD) configured for placement over a head of a user to display virtual content for viewing by the user's eyes. Such an HMD may comprise an augmented reality (AR) system, a virtual reality (VR) system, and/or any other type of HMD. Although the present disclosure focuses, in at least some respects, on a system 100 implemented as an HMD, it should be noted that the techniques described herein may be implemented using other types of systems/devices, without limitation.

FIG. 1 illustrates various example components of the system 100. For example, FIG. 1 illustrates an implementation in which the system includes processor(s) 102, storage 104, sensor(s) 110, I/O system(s) 116, and communication system(s) 118. Although FIG. 1 illustrates a system 100 as including particular components, one will appreciate, in view of the present disclosure, that a system 100 may comprise any number of additional or alternative components.

The processor(s) 102 may comprise one or more sets of electronic circuitries that include any number of logic units, registers, and/or control units to facilitate the execution of computer-readable instructions (e.g., instructions that form a computer program). Such computer-readable instructions may be stored within storage 104. The storage 104 may comprise physical system memory and may be volatile, non-volatile, or some combination thereof. Furthermore, storage 104 may comprise local storage, remote storage (e.g., accessible via communication system(s) 116 or otherwise), or some combination thereof. Additional details related to processors (e.g., processor(s) 102) and computer storage media (e.g., storage 104) will be provided hereinafter.

In some implementations, the processor(s) 102 may comprise or be configurable to execute any combination of software and/or hardware components that are operable to facilitate processing using machine learning models or other artificial intelligence-based structures/architectures. For example, processor(s) 102 may comprise and/or utilize hardware components or computer-executable instructions operable to carry out function blocks and/or processing layers configured in the form of, by way of non-limiting example, single-layer neural networks, feed forward neural networks, radial basis function networks, deep feed-forward networks, recurrent neural networks, long-short term memory (LSTM) networks, gated recurrent units, autoencoder neural networks, variational autoencoders, denoising autoencoders, sparse autoencoders, Markov chains, Hopfield neural networks, Boltzmann machine networks, restricted Boltzmann machine networks, deep belief networks, deep convolutional networks (or convolutional neural networks), deconvolutional neural networks, deep convolutional inverse graphics networks, generative adversarial networks, liquid state machines, extreme learning machines, echo state networks, deep residual networks, Kohonen networks, support vector machines, neural Turing machines, and/or others.

As will be described in more detail, the processor(s) 102 may be configured to execute instructions 106 stored within storage 104 to perform certain actions associated with imaging using SPAD arrays. The actions may rely at least in part on data 108 (e.g., avalanche event counting or tracking, etc.) stored on storage 104 in a volatile or non-volatile manner.

In some instances, the actions may rely at least in part on communication system(s) 118 for receiving data from remote system(s) 120, which may include, for example, separate systems or computing devices, sensors, and/or others. The communications system(s) 120 may comprise any combination of software or hardware components that are operable to facilitate communication between on-system components/devices and/or with off-system components/devices. For example, the communications system(s) 120 may comprise ports, buses, or other physical connection apparatuses for communicating with other devices/components. Additionally, or alternatively, the communications system(s) 120 may comprise systems/components operable to communicate wirelessly with external systems and/or devices through any suitable communication channel(s), such as, by way of non-limiting example, Bluetooth, ultra-wideband, WLAN, infrared communication, and/or others.

FIG. 1 illustrates that a system 100 may comprise or be in communication with sensor(s) 110. Sensor(s) 110 may comprise any device for capturing or measuring data representative of perceivable phenomenon. By way of non-limiting example, the sensor(s) 110 may comprise one or more image sensors, microphones, thermometers, barometers, magnetometers, accelerometers, gyroscopes, and/or others.

FIG. 1 also illustrates that the sensor(s) 110 include SPAD array(s) 112. As depicted in FIG. 1, a SPAD array 112 comprises an arrangement of SPAD pixels 122 that are each configured to facilitate avalanche events in response to sensing a photon, as described hereinabove. SPAD array(s) 112 may be implemented on a system 100 (e.g., an MR HMD) to facilitate image capture for various purposes (e.g., to facilitate computer vision tasks, pass-through imagery, and/or others).

FIG. 1 also illustrates that the sensor(s) 110 include inertial measurement unit(s) 114 (IMU(s) 114). IMU(s) 114 may comprise any number of accelerometers, gyroscopes, and/or magnetometers to capture motion data associated with the system 100 as the system moves within physical space. The motion data may comprise or be used to generate pose data, which may describe the position and/or orientation (e.g., 6 degrees of freedom pose) and/or change of position (e.g., velocity and/or acceleration) and/or change of orientation (e.g., angular velocity and/or angular acceleration) of the system 100.

Furthermore, FIG. 1 illustrates that a system 100 may comprise or be in communication with I/O system(s) 116. I/O system(s) 116 may include any type of input or output device such as, by way of non-limiting example, a touch screen, a mouse, a keyboard, a controller, and/or others, without limitation. For example, the I/O system(s) 116 may include a display system that may comprise any number of display panels, optics, laser scanning display assemblies, and/or other components.

Figure 2:
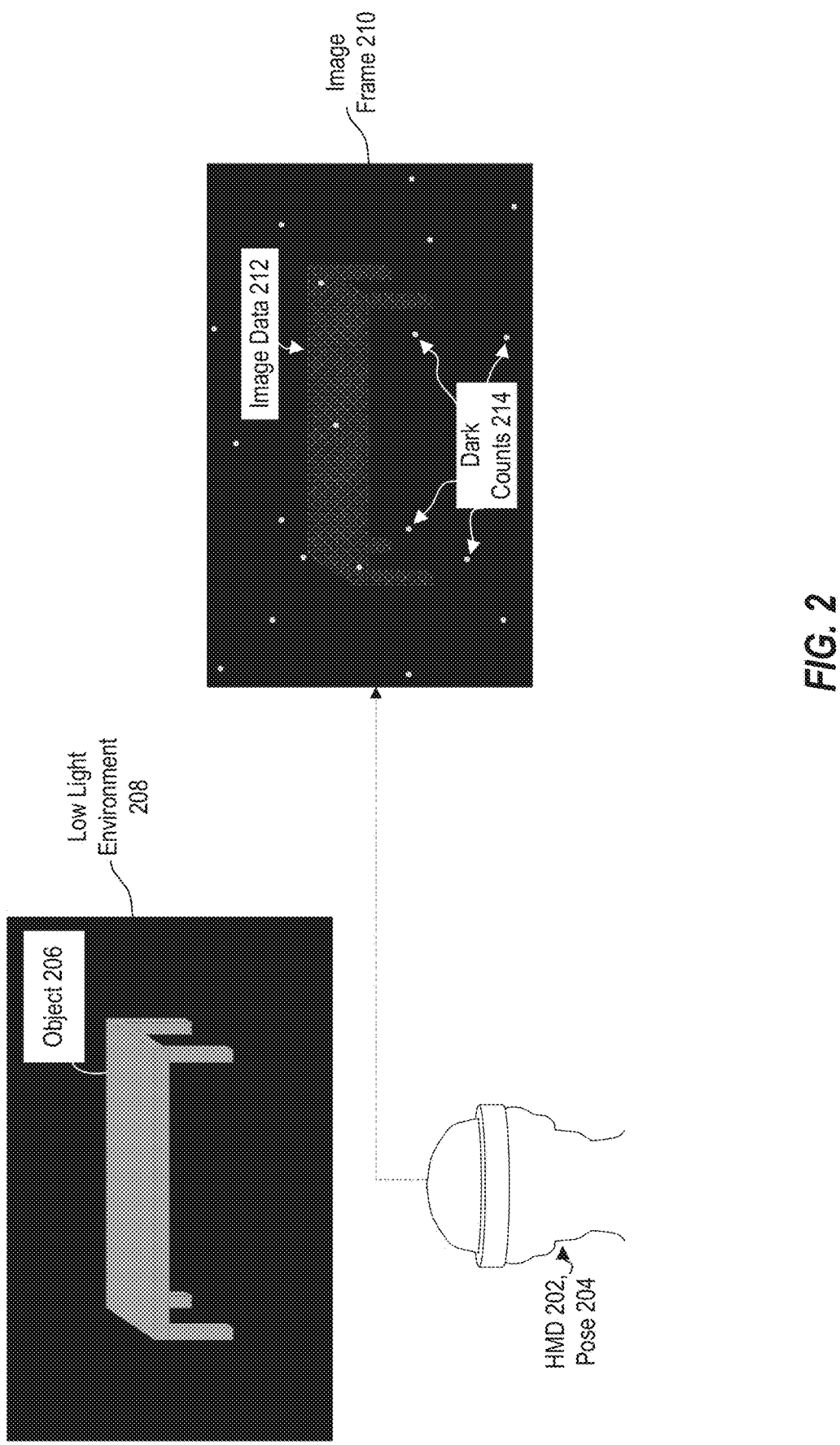
FIG. 2 illustrates an example of capturing an image frame of an object in a low light environment using a single photon avalanche diode (SPAD) array of a head-mounted display (HMD)

Attention is now directed to FIG. 2, which illustrates an example of capturing an image frame 210 of an object 206 (e.g., a table) in a low light environment 208 using a single photon avalanche diode (SPAD) array of a head-mounted display 202 (HMD 202). The HMD 202 corresponds, in at least some respects, to the system 100 disclosed hereinabove. For example, the HMD 202 includes a SPAD array (e.g., SPAD array(s) 112) that includes SPAD pixels configured for photon detection to capture images. In the example shown in FIG. 2, the HMD 202 is positioned according to pose 204 while capturing the image frame 210 of the object 206 in the low light environment 208. The pose 204 may be tracked or measured utilizing sensors (e.g., IMU(s) 114, camera(s) to facilitate simultaneous localization and mapping (SLAM), etc.) of the HMD 202.

FIG. 2 illustrates that the image frame 210 includes image data 212 depicting a noisy representation of the object 206. In some instances, this occurs when imaging under low light conditions (e.g., about 1 millilux or below) due to the low number of photons detected by SPAD pixels over the frame capture time period for capturing the image frame 210. FIG. 2 also illustrates the image frame 210 as including dark counts 214, which are depicted as high-frequency noise interspersed throughout the image frame 210. As discussed above, dark counts 214 may result from dark current occurring in SPAD pixels. The following discussion refers to various techniques that may be employed to provide an improved representation of the object 206 in SPAD imagery (e.g., by reducing the noise in the image data 212 depicting the object 206 and by compensating for the dark counts 214).

Figure 3:
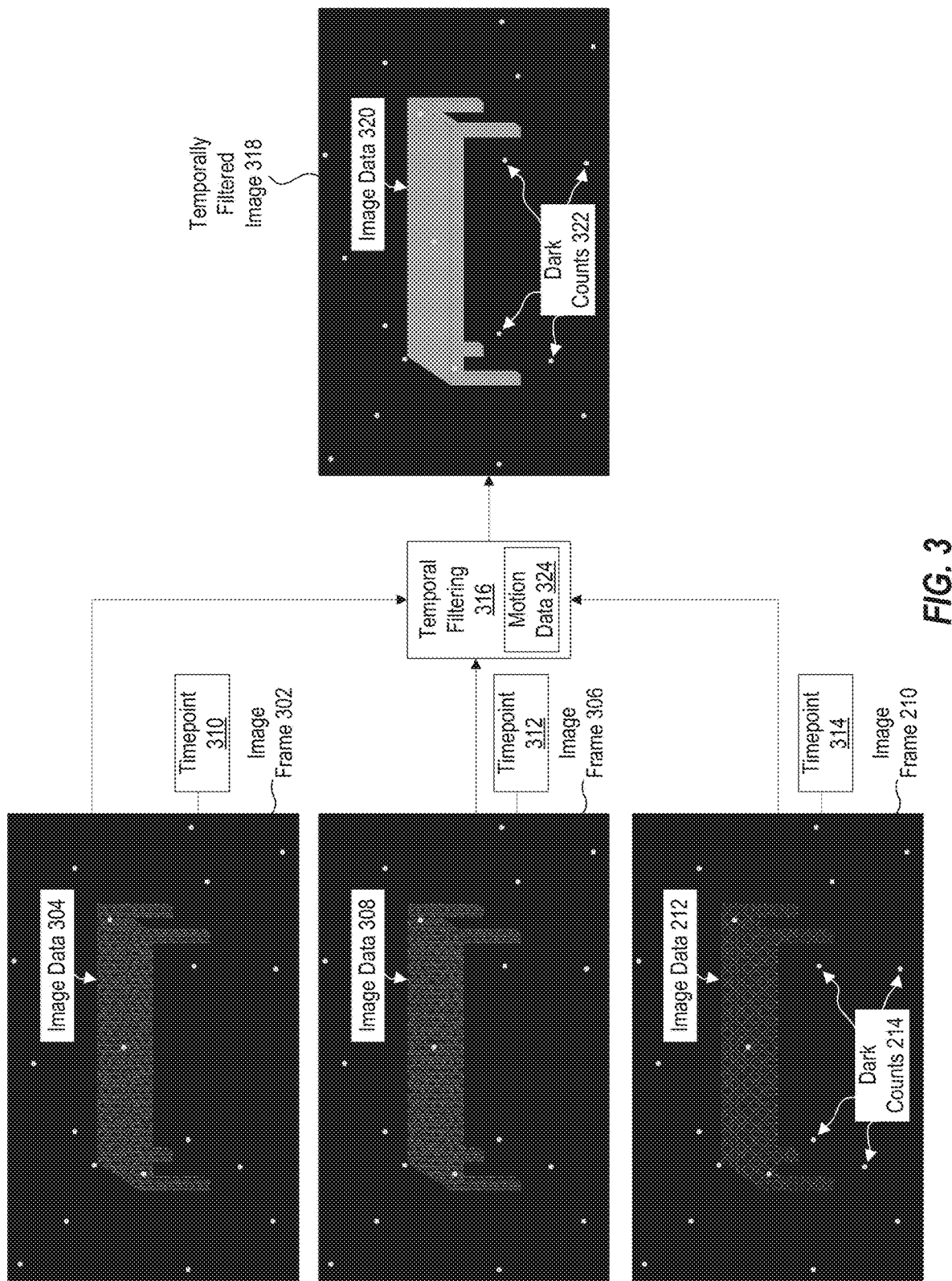
FIG. 3 illustrates an example of generating a temporally filtered image using consecutively captured image frames captured by a SPAD array of an HMD.

FIG. 3 illustrates an example of generating a temporally filtered image using consecutively captured image frames captured by a SPAD array of an HMD. In particular, FIG. 3 shows the image frame 210 (and its image data 212 and dark counts 214), as well as additional image frames 302 and 306 (e.g., captured by the HMD 202). Each of the additional image frames 302 and 306 include image data depicting the object 206 (i.e., image data 304 and 308, respectively) and include dark counts. FIG. 3 also indicates that the different image frames 210, 302, and 306 are captured at different timepoints. In particular, FIG. 3 indicates that image frame 302 was captured at timepoint 310, image frame 306 was captured at timepoint 312, and image frame 210 was captured at timepoint 314. In the present example, timepoint 310 temporally precedes timepoints 312 and 314, and timepoint 312 temporally precedes timepoint 314.

As indicated above, image data of consecutively captured image frames may be combined to form a composite image to facilitate adequate exposure of objects captured within the image frames (e.g., particularly under low light conditions). Accordingly, FIG. 3 illustrates temporal filtering 316 performed on the image frames 302, 306, and 210. Temporal filtering 316 includes combining corresponding image pixels of the different image frames 302, 306, and 210 to generate pixel values for an output image (i.e., temporally filtered image 318). "Corresponding image pixels" in different image frames are image pixels of different image frames that capture the same portion of a captured environment.

Corresponding image pixels of the different image frames 302, 306, and 210 may be combined or composited in various ways, such as by summing, averaging (e.g., weighted averaging), alpha blending, and/or others, and the manner/parameters of combining corresponding image pixels may differ for different pixel regions and/or may be dynamically determined based on various factors (e.g., signal strength, amount of motion, motion detected in a captured scene, etc.).

In some instances, image frames 302, 306, and 210 capture the object 206 from poses that are at least slightly different from one another. For example, the HMD 202 may capture image frames 302 and 306 from poses that at least slightly differ from pose 204 and/or from one another. Accordingly, in some instances, to align corresponding pixels of different image frames 302, 306, 210, temporal filtering 316 may utilize motion data 324, which may comprise or be used to generate pose data that describes the position and/or orientation (e.g., 6 degrees of freedom pose) and/or change of position (e.g., velocity and/or acceleration) and/or change of orientation (e.g., angular velocity and/or angular acceleration) of the HMD 202 during the capturing of the image frames 302, 306, and 210.

The motion data 324 may be used to align the image frames 302, 306, and 210 with one another. For example, a system may use the motion data 324 to align image frames 302 and 306 with pose 204 of image frame 210, thereby generating aligned image frames that are spatially aligned with one another (e.g., appearing as though they were all captured from pose 204 with the same capture perspective). In this regard, the temporal filtering 316 may comprise motion compensated temporal filtering.

In some instances, temporal filtering 316 additionally or alternatively utilizes optical flow estimations to align the image frames 302, 306, and 210 to facilitate image compositing to generate a composite image (i.e., temporally filtered image 318). For example, in some instances, a system downsamples the consecutively captured image frames and performs optical flow analysis to obtain vectors for aligning the pixels of the image frames. Furthermore, although the present disclosure focuses, in at least some respects, on temporal filtering operations that utilize image frames that temporally precede an image frame associated with a target timepoint to generate a composite image associated with the target timepoint, temporal filtering operations may additionally or alternatively utilize at least some image frames that are temporally subsequent to an image frame associated with a target timepoint to generate a composite image associated with the target timepoint.

FIG. 3 illustrates that the temporal filtering 316 generates a temporally filtered image 318 based on the composited image data 304, 308, and 212 of the image frames 302, 306, and 210 (e.g., after motion compensation). In the example depicted in FIG. 3, the temporally filtered image 318 includes image data 320 that represents the object 206 with reduced noise and improved signal (e.g., relative to the individual representations of the object 206 in the image data 304, 308, 212 of the image frames 302, 306, and 210, respectively). However, FIG. 3 illustrates that the temporally filtered image 318 still includes dark counts 322, which negatively affect image quality.

Figure 4:
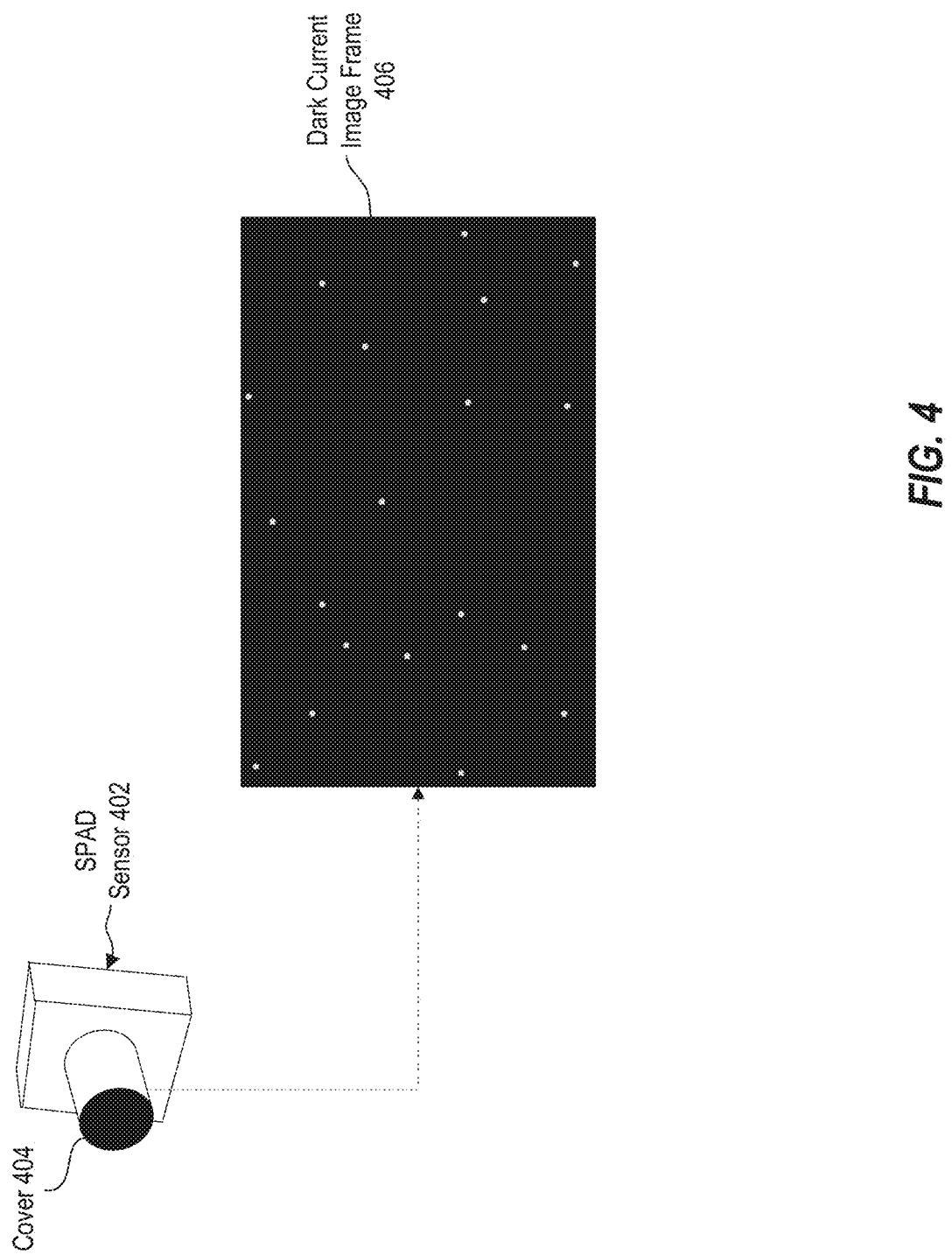
FIG. 4 illustrates an example of capturing a dark current image frame using a SPAD sensor.

Accordingly, embodiments of the present disclosure provide dark count compensation techniques for facilitating improved SPAD imagery. FIG. 4 illustrates an example of capturing a dark current image frame 406 using a SPAD sensor 402. In the present example, the SPAD sensor 402 is part of the HMD 202 and comprises a SPAD array with a plurality of SPAD pixels. FIG. 4 illustrates a cover 404 occluding or obscuring the SPAD pixels of the SPAD sensor 402. The cover 404 may comprise any material or device that blocks light in any desired wavelength range (e.g., the visible spectrum, the near-IR spectrum, the IR spectrum, and/or others).

FIG. 4 illustrates an example in which the dark current image frame 406 is captured with the cover 404 positioned to prevent photons from reaching the SPAD pixels of the SPAD array of the SPAD sensor 402. The dark current image frame 406 may be obtained as a part of a calibration step performed in preparation for use of the HMD 202 in user applications (e.g., prior to the capturing of the image frames 302, 306, and/or 210). The dark current image frame 406 may comprise a single image frame captured by the SPAD sensor 402 while obscured by the cover 404, or the dark current image frame 406 may be generated based on any number of image frames captured by the SPAD sensor 402 while obscured by the cover 404. For example, the dark current image frame 406 may be generated by temporally averaging per-pixel intensity values of any number of image frames captured by the SPAD sensor 402 while blocked by the cover 404.

As is evident from FIG. 4, the dark current image frame 406 includes dark counts and therefore includes data indicating which SPAD pixels of the SPAD sensor 402 are associated with detecting avalanche events without being exposed to photons. This information may be used to compensate for dark current in image frames captured at runtime.

Figure 5:
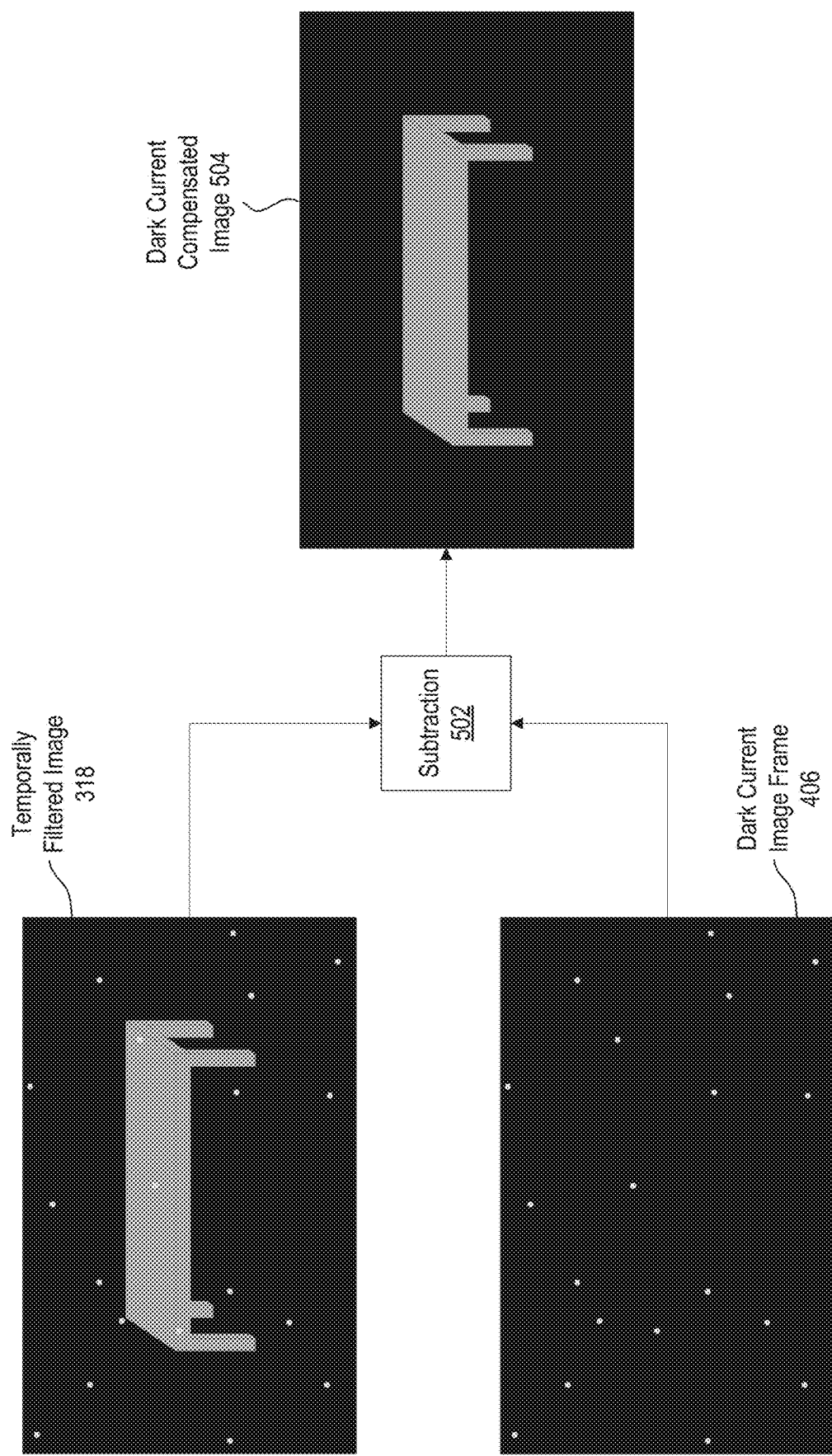
FIG. 5 illustrates an example of generating a dark current compensated image using a dark current image frame.

FIG. 5 illustrates an example of generating a dark current compensated image using a dark current image frame. In particular, FIG. 5 shows the temporally filtered image 318 (discussed above with reference to FIG. 3) and the dark current image frame 406 being provided as inputs to subtraction 502. Subtraction 502 may comprise subtracting intensity values of the dark current image frame 406 from intensity values of the temporally filtered image 318 on a per-pixel basis. FIG. 5 illustrates a dark current compensated image 504 provided as output of the subtraction 502. As is evident from FIG. 5, the dark current compensated image 504 substantially omits the dark counts that were present in the temporally filtered image 318, in view of the subtraction 502 based on the dark current image frame 406. Accordingly, the effects of dark current in SPAD imagery, particularly SPAD imagery captured under low light conditions, may be ameliorated.

FIGS. 2-5 have focused on a simple example of dark current compensation that utilizes a dark current image frame captured under controlled conditions (e.g., with a stop filter obfuscating the SPAD pixels of the SPAD sensor). However, in some instances, ambient conditions present while capturing a dark current image frame differ from ambient conditions present while capturing SPAD imagery at runtime. Because the severity of image noise brought about by dark current can vary with ambient conditions, such as temperature, discrepancies between dark current image frame capture conditions and runtime image frame capture conditions can cause systems to undercompensate or overcompensate for dark counts in SPAD imagery.

Figure 6:
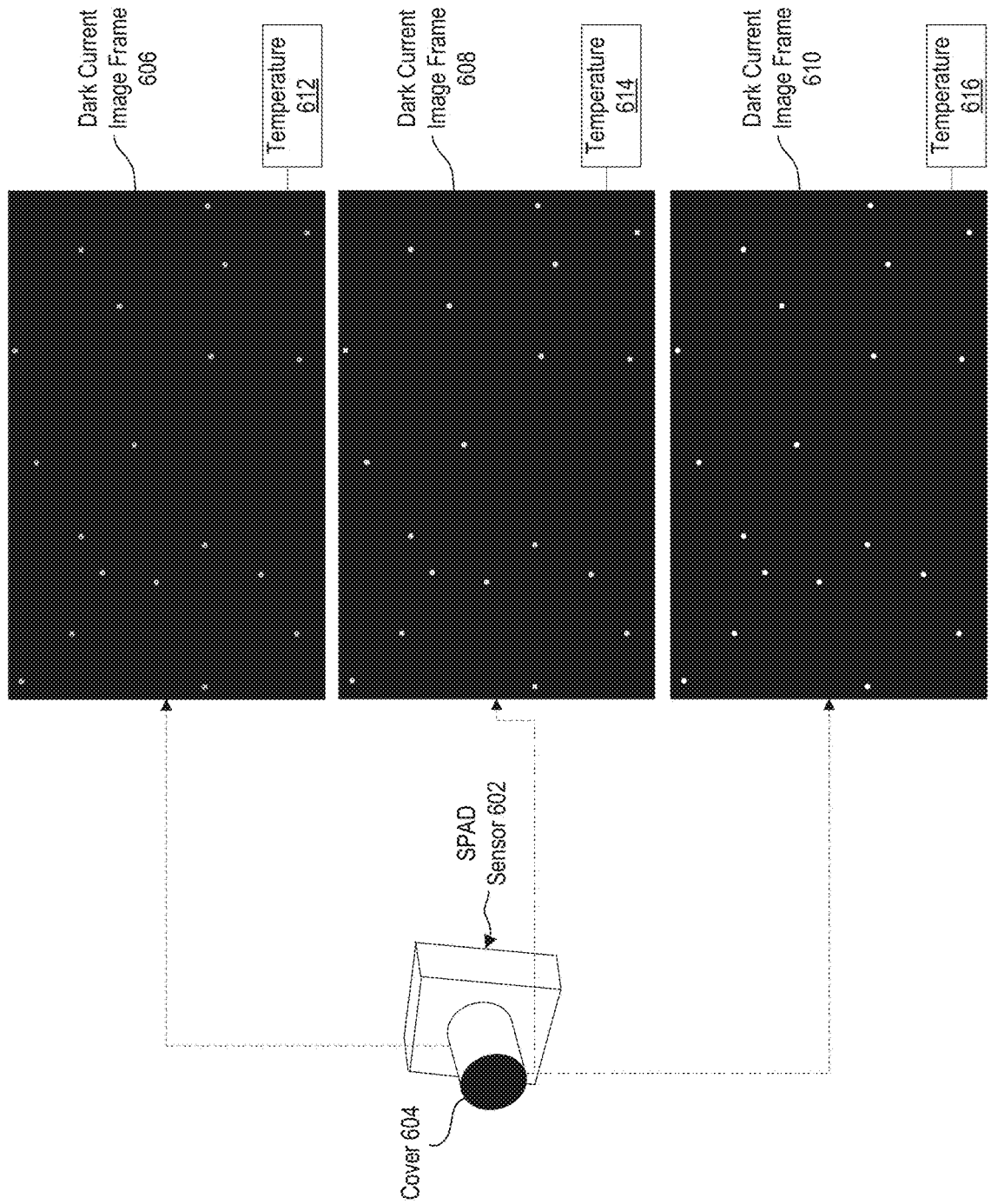
FIG. 6 illustrates an example of capturing multiple dark current image frames using a SPAD sensor under different temperature conditions.

Accordingly, at least some implementations of the present disclosure account for differences between dark current image frame capture conditions and runtime image frame capture conditions. FIG. 6 illustrates a SPAD sensor 602, which corresponds to the SPAD sensor 402 of FIG. 4. The SPAD sensor 602 is similarly obscured by a cover 604 that prevents photons from reaching the SPAD pixels of the SPAD sensor 602. FIG. 6 illustrates a plurality of different dark current image frames 606, 608, and 610 captured using the SPAD sensor 602 while blocked by the cover 604 (e.g., during calibration). FIG. 6 illustrates that each of the different dark current image frames 606, 608, 610 are associated with different temperature values (or ranges of temperature values). For example, different dark current image frames may be captured under different temperature conditions, such that different dark current images are available to facilitate dark current compensation under different runtime temperature conditions. In the example shown in FIG. 6, dark current image frame 606 is associated with temperature 612, dark current image frame 608 is associated with temperature 614, and dark current image frame 610 is associated with temperature 616.

Figure 7:
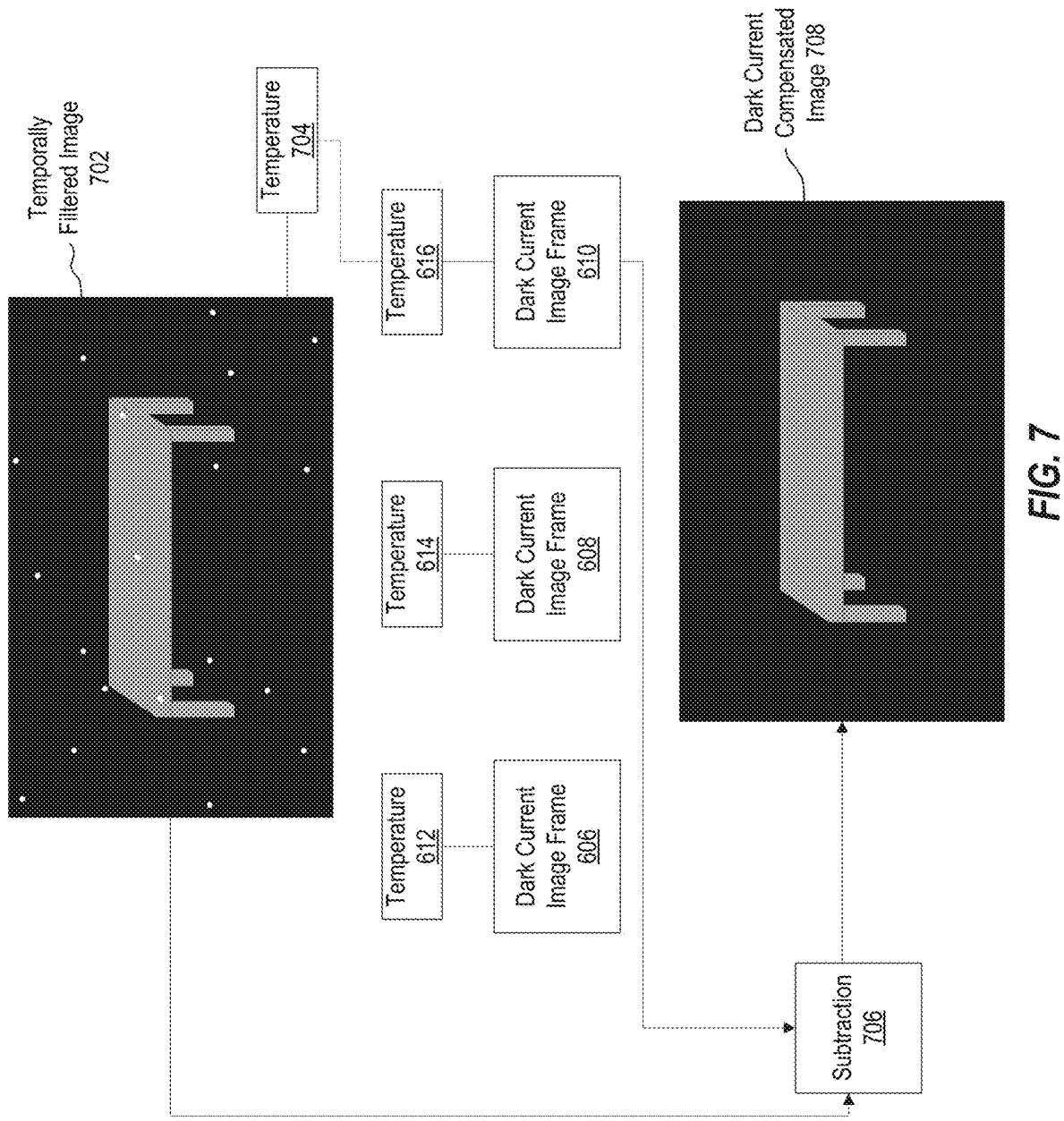
FIG. 7 illustrates an example of generating a dark current compensated image using a dark current image selected based on temperature conditions at runtime.

FIG. 7 illustrates an example of generating a dark current compensated image using a dark current image selected based on temperature conditions at runtime. In particular, FIG. 7 illustrates a temporally filtered image 702, which, according to the present example, captures the object 206 in the low light environment 208 discussed above and is captured by the HMD 202 in accordance with the principles discussed hereinabove with reference to FIGS. 2-3 (e.g., utilizing temporal filtering based on consecutively captured image frames). Temporally filtered image 702 is acquired at runtime (e.g., after the capturing of the dark current image frames of FIG. 6).

In the example of FIG. 7, the temporally filtered image 702 is associated with a temperature 704, which may correspond to an environment temperature and/or device temperature present for the capturing of one or more of the image frames used to generate the temporally filtered image 702. In some instances, the temperature 704 is captured using sensors (e.g., sensor(s) 110) of the HMD 202.

FIG. 7 also illustrates the dark current image frames 606, 608, and 610 discussed above with reference to FIG. 6, along with their respective temperatures 612, 614, and 616. FIG. 7 conceptually depicts that a system may select a dark current image frame to use for dark current compensation based on the temperature 704 associated with the temporally filtered image 702 obtained at runtime. For example, FIG. 7 illustrates a dashed line extending between the temperature 704 of the temporally filtered image 702 and the temperature 616 of the dark current image frame 610, indicating that a system may determine that the temperature 704 of the temporally filtered image 702 is most similar to the temperature 616 of dark current image frame 610 (relative to the temperatures 612 and 614 of the other available dark current image frames 606 and 608, respectively).

Based on this selection, FIG. 7 illustrates the temporally filtered image 702 and the dark current image frame 610 being provided as inputs to subtraction 706 (which corresponds in function to subtraction 502 discussed above with reference to FIG. 5). As shown in FIG. 7, the subtraction 706 provides a dark current compensated image 708, which substantially omits dark counts that were present in the temporally filtered image (e.g., they are subtracted out using the dark current image frame 610). Accordingly, a system may intelligently select from among available dark current image frames (each associated with a respective temperature or range of temperatures) based on a measured runtime temperature.

Although the foregoing example focuses on using temperature as a basis for selecting a dark current image frame to use to subtract dark counts from a temporally filtered image, temperature may, in some instances, be used to generate a scaled or interpolated dark current image for facilitating dark current compensation. For example, in some instances, a runtime temperature does not exactly match or is not within a particular range of a temperature value associated with a previously captured dark current image frame. To accommodate such circumstances, the runtime temperature and one or more of the temperatures associated with dark current image frames may be used to generate a dark current factor, which may comprise a ratio of the runtime temperature and a dark current image frame temperature (e.g., where the runtime temperature 30° C. and the nearest temperature associated with a dark current image frame is 25° C., a dark current factor may be 1.2). A system may then use the dark current factor to generate a scaled dark current image (e.g., by applying the dark current factor to the per-pixel intensity values of a nearest-temperature dark current image frame) and use the scaled dark current image frame to facilitate dark current compensation (e.g., via subtraction as discussed above). In this same vein, temperature values associated with a runtime image and one or more dark current image frames may be used to generate an interpolated or extrapolated dark current image frame to be used for dark current compensation (e.g., where a runtime temperature lies between two temperature values associated with different dark current images).

Thus, temperature may be used as a factor (e.g., a "dark current factor") for selecting or generating a dark current image frame to use for facilitating dark current compensation. Additional or alternative dark current factors are within the scope of the present disclosure for selecting or generating a dark current image frame to facilitate dark current compensation. In some implementations, a dark current image frame may be selected or generated in a manner that is agnostic toward explicit temperature measurements, which may advantageously eliminate the need for runtime temperature measurements/sensors.

Figure 8:
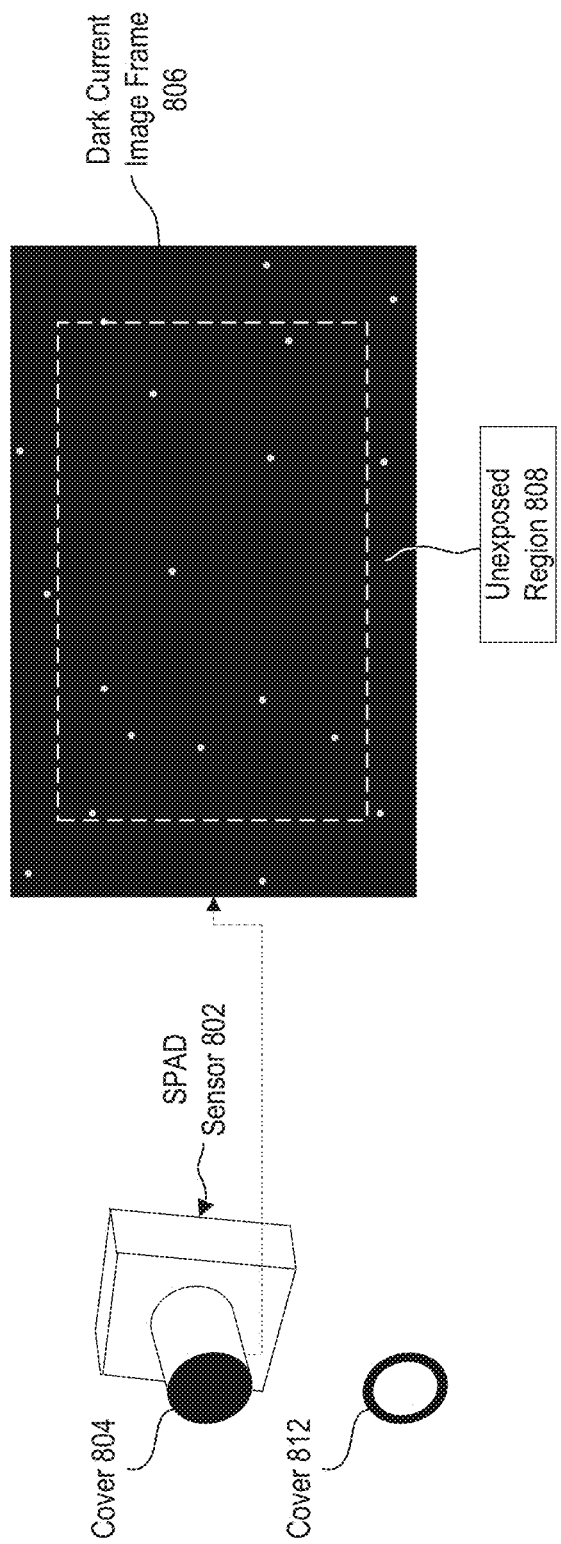
FIG. 8 illustrates an example dark current image frame that includes a region of unexposed SPAD pixels that will be unexposed while capturing image frames at runtime.

FIG. 8 illustrates an example SPAD sensor 802, which may be part of the HMD 202 and may correspond, in at least some respects, to the SPAD sensors 602, 402 discussed hereinabove. For example, the SPAD sensor 802 is similarly obscured by a cover 804 to prevent photons from reaching the SPAD pixels of the SPAD sensor 802 while capturing the dark current image frame 806 (e.g., during a calibration step). The dark current image frame 806 includes dark counts, similar to the dark current image frames discussed above.

The example shown in FIG. 8 conceptually depicts an unexposed region 808 of SPAD pixels of the SPAD sensor 802 that capture a portion of the dark current image frame 806 (indicated by the dashed line that defines an outer boundary portion of the dark current image frame 806). Although all SPAD pixels of the SPAD sensor 802 are covered by the cover 804 during the capturing of the dark current image frame 806, the unexposed region 808 of SPAD pixels are also obscured while capturing image frames at runtime. For example, FIG. 8 illustrates an example representation of a cover 812 that may be used at runtime to prevent photons from reaching the unexposed region 808 of SPAD pixels of the SPAD sensor 802. The particular structure and/or configuration of the cover 812 is provided as an example only, and a cover may take on any form and be positioned at any desirable portion of the SPAD sensor 802 to prevent photons from reaching the unexposed region 808 of SPAD pixels.

As is evident from FIG. 8, at least some of the SPAD pixels within the unexposed region 808 detect dark counts for the dark current image frame 806 without detecting photon counts from any captured environment. In some instances, where a cover 812 is used at runtime, the SPAD pixels within the unexposed region 808 continue to detect dark counts for runtime images without detecting photon counts from any captured environment. As will be described in more detail hereinafter, dark counts detected within the unexposed region 808 of SPAD pixels during calibration (e.g., while capturing dark current image frames 806) and during runtime may be leveraged to facilitate dark current compensation (without relying on explicit temperature measurements).

Figure 9:
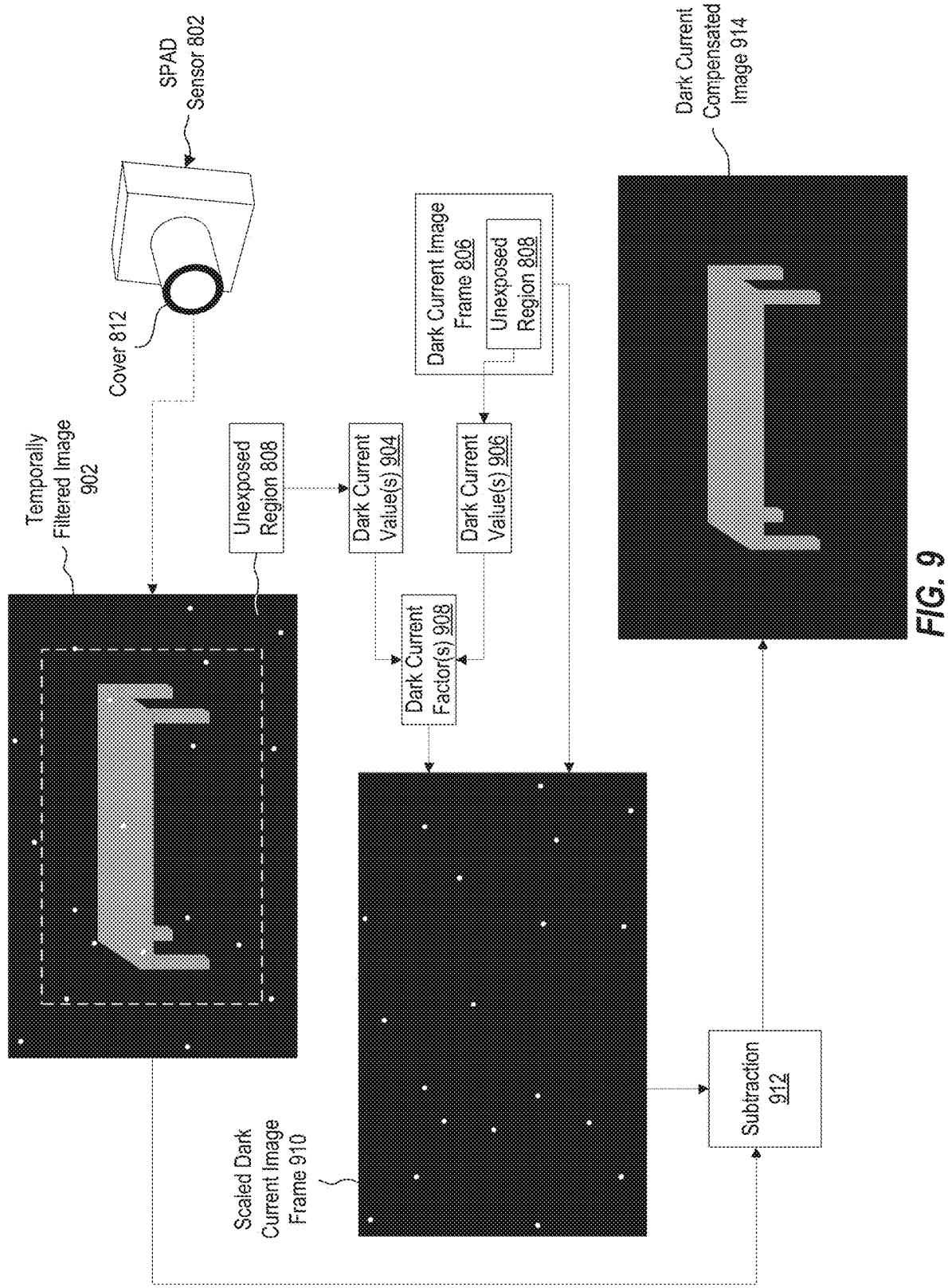
FIG. 9 illustrates an example of generating a dark current compensated image using a dark current image frame that is scaled using a dark current factor, where the dark current factor is determined based on runtime sensor data of unexposed SPAD pixels.

FIG. 9 illustrates an the SPAD sensor 802 at runtime with the cover 812 positioned on the SPAD sensor 802 to prevent photons from reaching the SPAD pixels of the unexposed region 808. FIG. 9 illustrates an example temporally filtered image 902 generated from image frames captured by the SPAD sensor 802 at runtime. As depicted in FIG. 9, the temporally filtered image 902 includes image data acquired using SPAD pixels within the unexposed region 808 (also marked via a dashed box associated with temporally filtered image 902). In the example shown in FIG. 9, the quantity of avalanche events (e.g., dark counts) detected at runtime by the SPAD pixels within the unexposed region 808 is used to determine dark current value(s) 904. The dark current value(s) 904 may comprise any quantification of the dark counts detected by the SPAD pixels within the unexposed region 808 at runtime. For example, the dark current value(s) 904 may comprise a sum, average, or other measure of the dark counts detected by the SPAD pixels within the unexposed region 808 at runtime.

FIG. 9 similarly illustrates dark current value(s) 906 detected based on dark counts detected by SPAD pixels within the unexposed region 808 while capturing the dark current image frame 806 (e.g., a sum, average, or other measure of the dark counts detected within the unexposed region 808 during calibration). A system may utilize the dark current value(s) 904 obtained based on runtime imagery (e.g., temporally filtered image) and the dark current value(s) 906 obtained based on calibration imagery (e.g., dark current image frame 806) to generate dark current factor(s) 908. The dark current factor(s) 908 may comprise any representation of a difference or similarity between the dark current value(s) 904 and the dark current value(s) 906, such as a ratio of the dark current value(s) 904 and the dark current value(s) 906. As a simplified example, where the runtime dark current value 904 comprises an average intensity of 2 and the dark current value(s) 906 comprises an average intensity of 1, the dark current factor(s) 908 may be 2.

As noted above, the quantity of dark current (and noise that results from dark counts) present in an image captured at runtime may depend on ambient conditions at runtime (e.g., temperature). Accordingly, the dark current value(s) 904 and the dark current factor(s) 908 may depend on ambient conditions at runtime. Thus, the dark current factor(s) 908 may be used to scale a previously captured dark current image frame to account for ambient conditions at runtime (e.g., ambient conditions that existed for capturing the temporally filtered image 902). FIG. 9 depicts a scaled dark current image frame 910, which may be generated by applying the dark current factor(s) 908 to a previously captured dark current image frame (e.g., dark current image frame 806). For example, the dark current factor(s) 908 may be multiplied by the per-pixel intensity values associated with the dark current image frame to generate pixel intensity values for the scaled dark current image frame 910.

As depicted in FIG. 9, the scaled dark current image frame 910 and the temporally filtered image 902 may be used as input to subtraction 912 to generate a dark current compensated image 914. Subtraction 912 generally corresponds to the subtraction operations 502 and 706 discussed hereinabove, and, in the example shown in FIG. 9, the dark current compensated image 914 substantially omits the dark count noise associated with the temporally filtered image 902.

Dark current values and/or dark current factors may be determined for entire unexposed regions (e.g., unexposed region 808) or multiple dark current values and/or dark current factors may be determined for different subsets of pixels of unexposed regions (e.g., rows, columns, and/or blocks of SPAD pixels of unexposed regions). Thus, different dark current factors may be used to scale different regions of a dark current image frame to generate a scaled dark current image frame. In this regard, dark current values, dark current factors, and/or dark current image frames may comprise or be associated with multiple constituent components or regions.

Although the foregoing examples focus, in at least some respects, on an unexposed region 808 of SPAD pixels that forms an outer boundary portion of the SPAD pixels of a SPAD sensor, other configurations are within the scope of the present disclosure. An unexposed region may comprise any suitable size and/or shape. Furthermore, one will appreciate, in view of the present disclosure, that an unexposed region may be omitted or excluded from output imagery (e.g., imagery that becomes displayed to one or more users).

Figure 10:
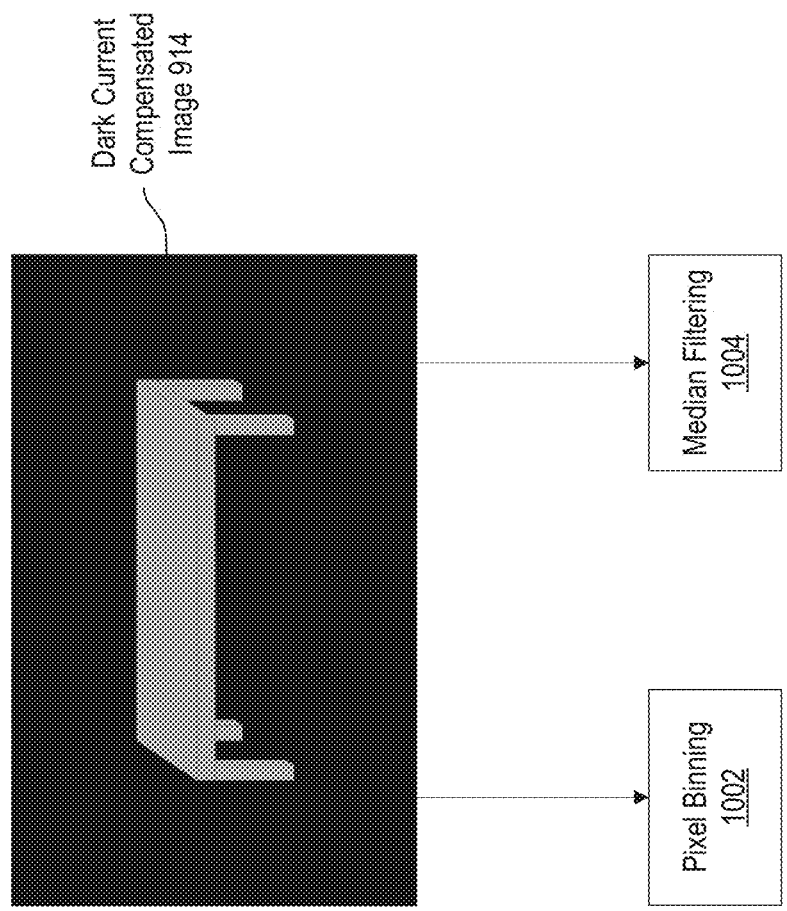
FIG. 10 illustrates example additional operations that may be performed on a dark current compensated image.

Although dark current compensation may, as described herein, be effective in removing dark count noise from SPAD imagery, at least some noise resulting from dark counts may remain in dark current compensated imagery. FIG. 10 illustrates example additional operations that may be performed on a dark current compensated image to further ameliorate dark count noise. In particular, FIG. 10 illustrates pixel binning 1002 and median filtering 1004, which may be performed on a dark current compensated image 914.

Pixel binning 1002 may include reducing sections of pixels in an original image (e.g., dark current compensated image 914) to a single pixel in the output image. For example, in some instances, each pixel in an output image is defined by a pixel of an original image:

$$p_d(m,n)=p(Km,Kn)$$

where $p_d$ is the pixel in the downsampled image, p is the pixel in the original image, K is a scaling factor, m is the pixel coordinate in the horizontal axis, and n is the pixel coordinate in the vertical axis. In some instances, the pixel binning 1002 also includes prefiltering functions for defining the pixels of the output image, such as anti-aliasing prefiltering to prevent aliasing artifacts.

In some implementations, pixel binning 1002 utilizes an averaging filter for defining the pixels of the output image based on the average of a section of pixels in the original image. In one example of pixel binning by a factor of 2 along each axis, each pixel in the output image is defined by an average of a 2×2 section of pixels in the original image:

$$p_d(m, n) = \frac{[p(2m, 2n) + p(2m, 2n+1) + p(2m+1, 2n) + p(2m+1, 2n+1)]}{4}$$

where $p_d$ is the pixel in the downsampled image, p is the pixel in the original image, m is the pixel coordinate in the horizontal axis, and n is the pixel coordinate in the vertical axis. Pixel binning 1002 may comprise iterative downsampling operations that are performed iteratively to arrive at an output image of a desired final image resolution.

Median filtering 1004 may comprise modifying each pixel value with the median pixel value of neighboring pixels (e.g., within a 3×3 pixel window centered about each pixel being modified). Because dark counts typically result in high frequency noise, median filtering 1004 may smooth out or remove dark counts that remain after dark current compensation operations discussed herein.

Figure 11:
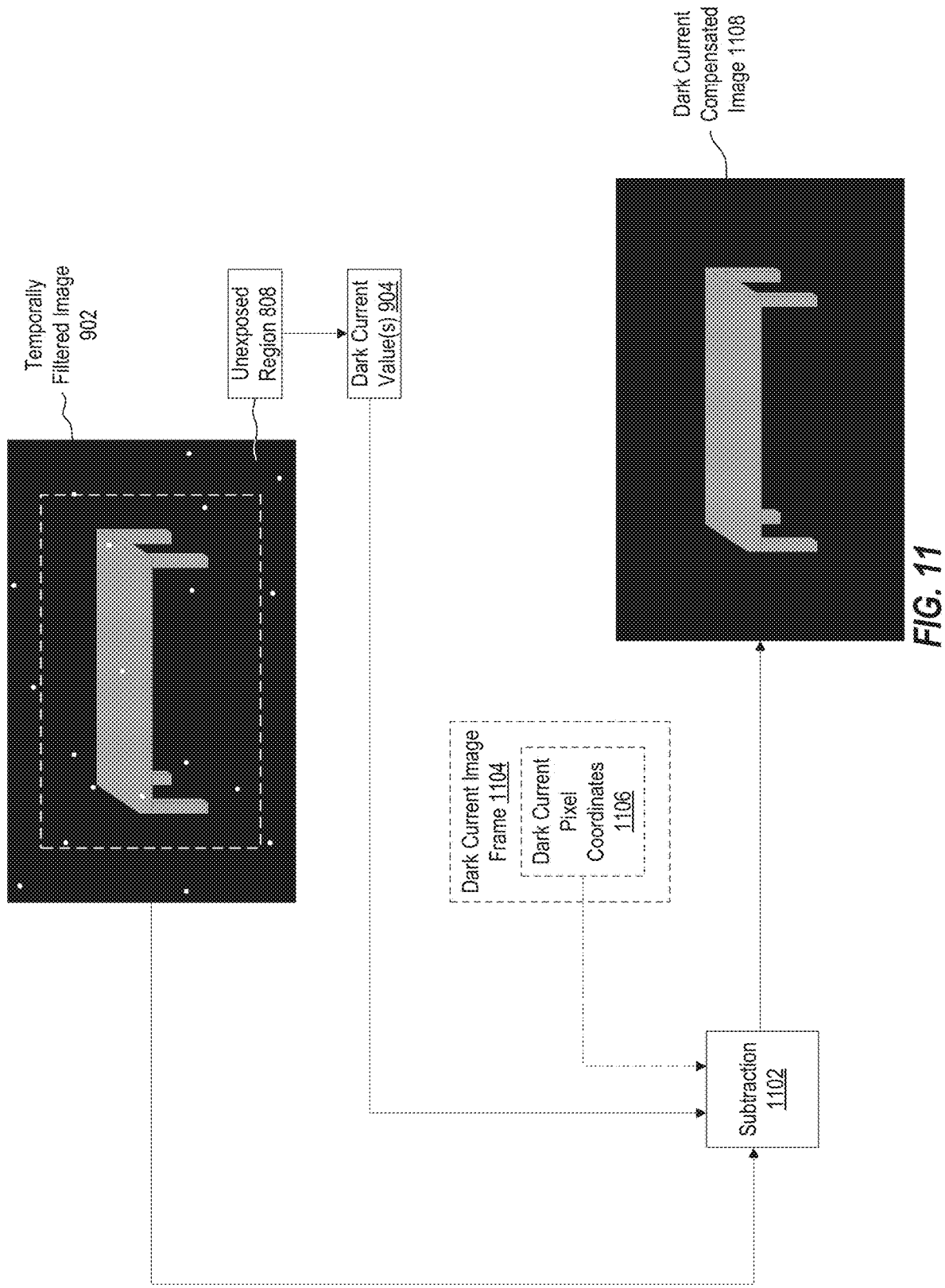
FIG. 11 illustrates an example of generating a dark current compensated image by subtracting a dark current value from pixels of an image frame captured at runtime, where the dark current value is determined based on runtime sensor data of unexposed SPAD pixels.

In some implementations, dark current compensation is performed without using a dark current image frame. For example, FIG. 11 illustrates the temporally filtered image 902 discussed above with reference to FIG. 9, which includes image data captured by an unexposed region 808 of SPAD pixels. FIG. 11 also illustrates the dark current value(s) 904 obtained based avalanche events detected by the SPAD pixels in the unexposed region 808 at runtime. FIG. 11 illustrates the dark current value(s) 904 and the temporally filtered image 902 provided as input to subtraction 1102 to generate a dark current compensated image 1108, indicating that the dark current value(s) 904 may be subtracted directly from intensity values of the temporally filtered image 902 without first being used to modify a dark current image frame to facilitate the subtraction.

Dark current value(s) 904 may be subtracted from all intensity values of the temporally filtered image 902, or the subtraction may, in some instances, be targeted to intensity values obtained by SPAD pixels known to generate dark current (e.g., based on a prior calibration operation). For example, FIG. 11 illustrates a dark current image frame 1104, which may be used to determine dark current pixel coordinates 1106 of SPAD pixels determined to generate dark current. These dark current pixel coordinates 1106 may be used to subtract the dark current value(s) 904 from only the intensity values obtained by SPAD pixels known to generate dark current, while refraining from subtracting the dark current value(s) 904 from other intensity values.

The dark current compensated image may be used for various purposes. For example, in some implementations, the HMD 202 (or another system) utilizes the dark current compensated image 1108 to facilitate stereo depth computations, simultaneous localization and mapping, object tracking, and/or others. For example, an HMD may generate a parallax-corrected dark current compensated image (e.g., by performing parallax reprojections using depth information, which may itself be generated using dark current compensated images) and display the parallax-corrected dark current compensated image to facilitate pass-through imaging.

Example Method(s) for Dark Current Compensation in SPAD Imagery

The following discussion now refers to a number of methods and method acts that may be performed by the disclosed systems. Although the method acts are discussed in a certain order and illustrated in a flow chart as occurring in a particular order, no particular ordering is required unless specifically stated, or required because an act is dependent on another act being completed prior to the act being performed. One will appreciate that certain embodiments of the present disclosure may omit one or more of the acts described herein.

Figure 12:
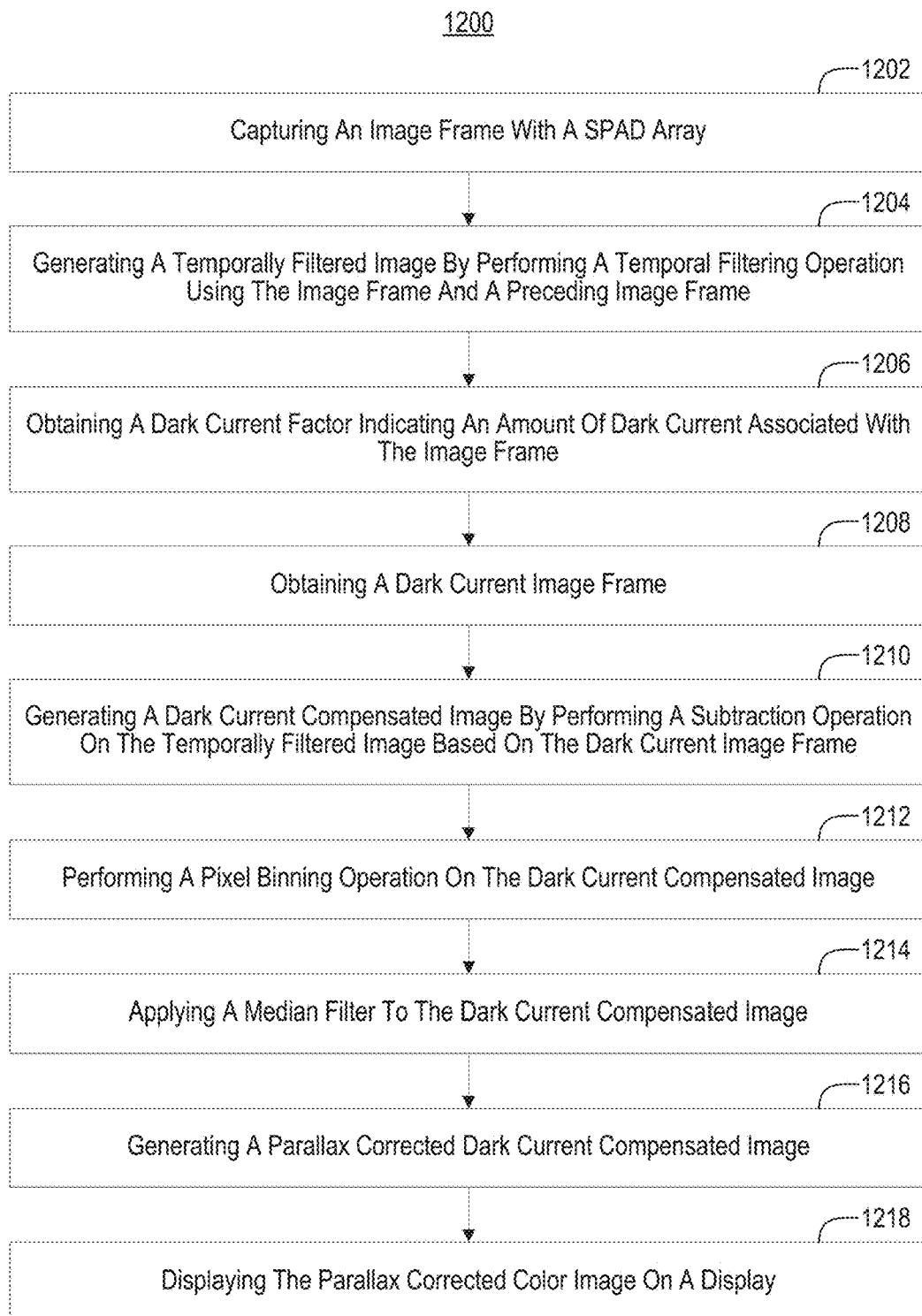
FIGS. 12 and 13 illustrate example flow diagrams depicting acts associated with compensating for dark current in SPAD imagery.
Figure 13:
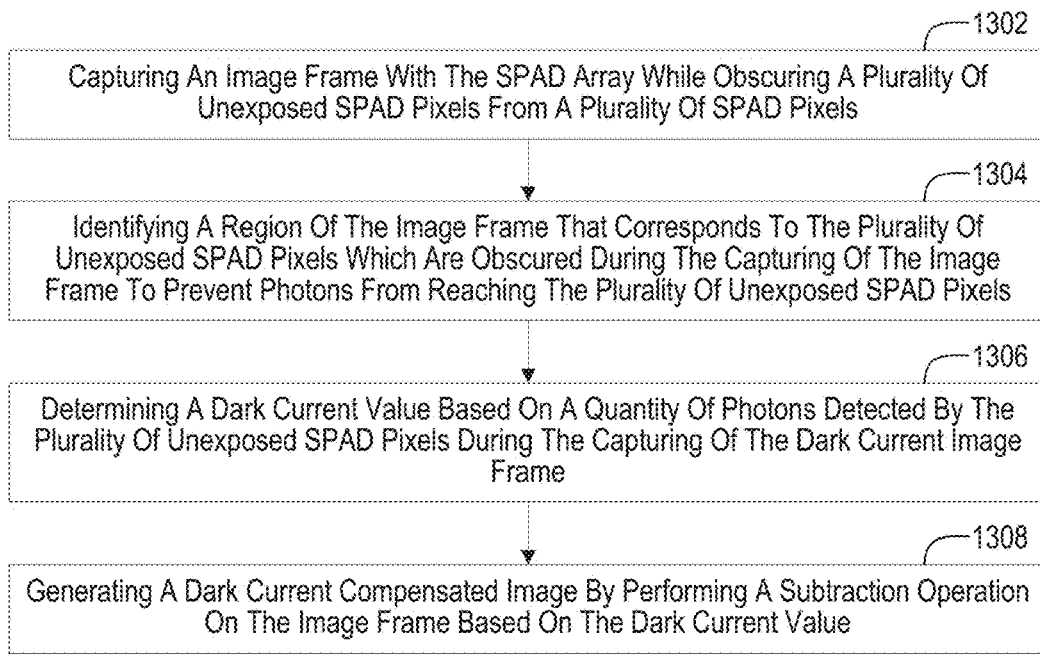

FIGS. 12 and 13 illustrate example flow diagrams 1200 and 1300, respectively, depicting acts associated with compensating for dark current in SPAD imagery. The discussion of the various acts represented in the flow diagrams include references to various hardware components described in more detail with reference to FIG. 1.

Act 1202 of flow diagram 1200 of FIG. 12 includes capturing an image frame with a SPAD array. Act 1202 is performed, in some instances, by a system utilizing processor(s) 102, storage 104, sensor(s) 110 (e.g., SPAD array 112), input/output system(s) 116, communication system(s) 118, and/or other components. In some implementations, the plurality of SPAD pixels of the SPAD array comprises a plurality of unexposed SPAD pixels that are covered during the capturing of the dark current image frame and during the capturing of the image frame.

Act 1204 of flow diagram 1200 includes generating a temporally filtered image by performing a temporal filtering operation using the image frame and a preceding image frame. Act 1204 is performed, in some instances, by a system utilizing processor(s) 102, storage 104, sensor(s) 110, input/output system(s) 116, communication system(s) 118, and/or other components. In some implementations, the preceding image frame is captured by the SPAD array at a timepoint that temporally precedes a timepoint associated with the image frame of act 1202. Furthermore, in some instances, the temporal filtering operation includes (i) generating an aligned preceding image frame by using motion data associated with the SPAD array to spatially align the preceding image frame with the image frame and (ii) compositing the image frame with the aligned preceding image frame. In some implementations, the temporal filtering operation is based on an optical flow estimation generated based on the preceding image frame and the image frame.

Act 1206 of flow diagram 1200 includes obtaining a dark current factor indicating an amount of dark current associated with the image frame. Act 1206 is performed, in some instances, by a system utilizing processor(s) 102, storage 104, sensor(s) 110, input/output system(s) 116, communication system(s) 118, and/or other components. In some implementations, the dark current factor is based on a runtime temperature detected in association with the capturing of the image frame, such that the selection of the dark current image frame from the plurality of dark current image frames is based on the runtime temperature. In some implementations, the dark current factor is based on (i) a quantity of avalanche events detected by the plurality of unexposed SPAD pixels during the capturing of the dark current image frame and (ii) a quantity of avalanche events detected by the plurality of unexposed SPAD pixels during the capturing of the image frame. For example, the dark current factor may be determined by comparing (i) an average intensity detected by the plurality of unexposed SPAD pixels during the capturing of the dark current image frame and (ii) an average intensity detected by the plurality of unexposed SPAD pixels during the capturing of the image frame. In some instances, the dark current factor comprises a plurality of dark current factor components. For example, in some instances, each dark current factor component is associated with a respective subset of unexposed SPAD pixels of the plurality of unexposed SPAD pixels.

Act 1208 of flow diagram 1200 includes obtaining a dark current image frame. Act 1208 is performed, in some instances, by a system utilizing processor(s) 102, storage 104, sensor(s) 110, input/output system(s) 116, communication system(s) 118, and/or other components. In some instances, the dark current image frame includes data indicating one or more SPAD pixels of the plurality of SPAD pixels that detect an avalanche event without detecting a corresponding photon. In some implementations, the dark current image frame is one of a plurality of dark current image frames captured while the SPAD array is covered to prevent photons from reaching the SPAD array. In some implementations, the dark current image frame is selected from the plurality of dark current image frames based on the dark current factor of act 1206. In some implementations, each of the plurality of dark current image frames is associated with a different temperature or range of temperatures. In some instances, the dark current image frame is obtained by generating an interpolated dark current image frame based on the runtime temperature and at least two dark current image frames of the plurality of dark current image frames.

Act 1210 of flow diagram 1200 includes generating a dark current compensated image by performing a subtraction operation on the temporally filtered image based on the dark current image frame. Act 1210 is performed, in some instances, by a system utilizing processor(s) 102, storage 104, sensor(s) 110, input/output system(s) 116, communication system(s) 118, and/or other components. In some implementations, the subtraction operation includes (i) generating a scaled dark current image frame by modifying the dark current image frame using the dark current factor, (ii) generating the scaled dark current image frame comprises using each of the plurality of dark current factor components to modify corresponding regions of the dark current image frame, and (iii) subtracting the scaled dark current image frame from the image frame.

Act 1212 of flow diagram 1200 includes performing a pixel binning operation on the dark current compensated image. Act 1212 is performed, in some instances, by a system utilizing processor(s) 102, storage 104, sensor(s) 110, input/output system(s) 116, communication system(s) 118, and/or other components.

Act 1214 of flow diagram 1200 includes applying a median filter to the dark current compensated image. Act 1214 is performed, in some instances, by a system utilizing processor(s) 102, storage 104, sensor(s) 110, input/output system(s) 116, communication system(s) 118, and/or other components.

Act 1216 of flow diagram 1200 includes generating a parallax corrected dark current compensated image. Act 1216 is performed, in some instances, by a system utilizing processor(s) 102, storage 104, sensor(s) 110, input/output system(s) 116, communication system(s) 118, and/or other components.

Act 1218 of flow diagram 1200 includes displaying the parallax corrected color image on a display. Act 1218 is performed, in some instances, by a system utilizing processor(s) 102, storage 104, sensor(s) 110, input/output system(s) 116, communication system(s) 118, and/or other components.

Act 1302 of flow diagram 1300 of FIG. 13 includes capturing an image frame with the SPAD array while obscuring a plurality of unexposed SPAD pixels from a plurality of SPAD pixels. Act 1302 is performed, in some instances, by a system utilizing processor(s) 102, storage 104, sensor(s) 110 (e.g., SPAD array 112), input/output system(s) 116, communication system(s) 118, and/or other components.

Act 1304 of flow diagram 1300 includes identifying a region of the image frame that corresponds to the plurality of unexposed SPAD pixels which are obscured during the capturing of the image frame to prevent photons from reaching the plurality of unexposed SPAD pixels. Act 1304 is performed, in some instances, by a system utilizing processor(s) 102, storage 104, sensor(s) 110, input/output system(s) 116, communication system(s) 118, and/or other components.

Act 1306 of flow diagram 1300 includes determining a dark current value based on a quantity of photons detected by the plurality of unexposed SPAD pixels during the capturing of the dark current image frame. Act 1306 is performed, in some instances, by a system utilizing processor(s) 102, storage 104, sensor(s) 110, input/output system(s) 116, communication system(s) 118, and/or other components. In some instances, the dark current value is determined as an average intensity based on the quantity of photons detected by the plurality of unexposed SPAD pixels during the capturing of the image frame.

Act 1308 of flow diagram 1300 includes generating a dark current compensated image by performing a subtraction operation on the image frame based on the dark current value. Act 1308 is performed, in some instances, by a system utilizing processor(s) 102, storage 104, sensor(s) 110, input/output system(s) 116, communication system(s) 118, and/or other components. In some implementations, the subtraction operation includes subtracting the dark current value from one or more SPAD pixels of the plurality of SPAD pixels determined to generate dark current based on a previously performed calibration operation, while refraining from subtracting the dark current value from other SPAD pixels of the plurality of SPAD pixels that are separate from the one or more SPAD pixels.

Example Systems and Techniques for Obtaining Color Imagery Using SPADs

Figure 14:
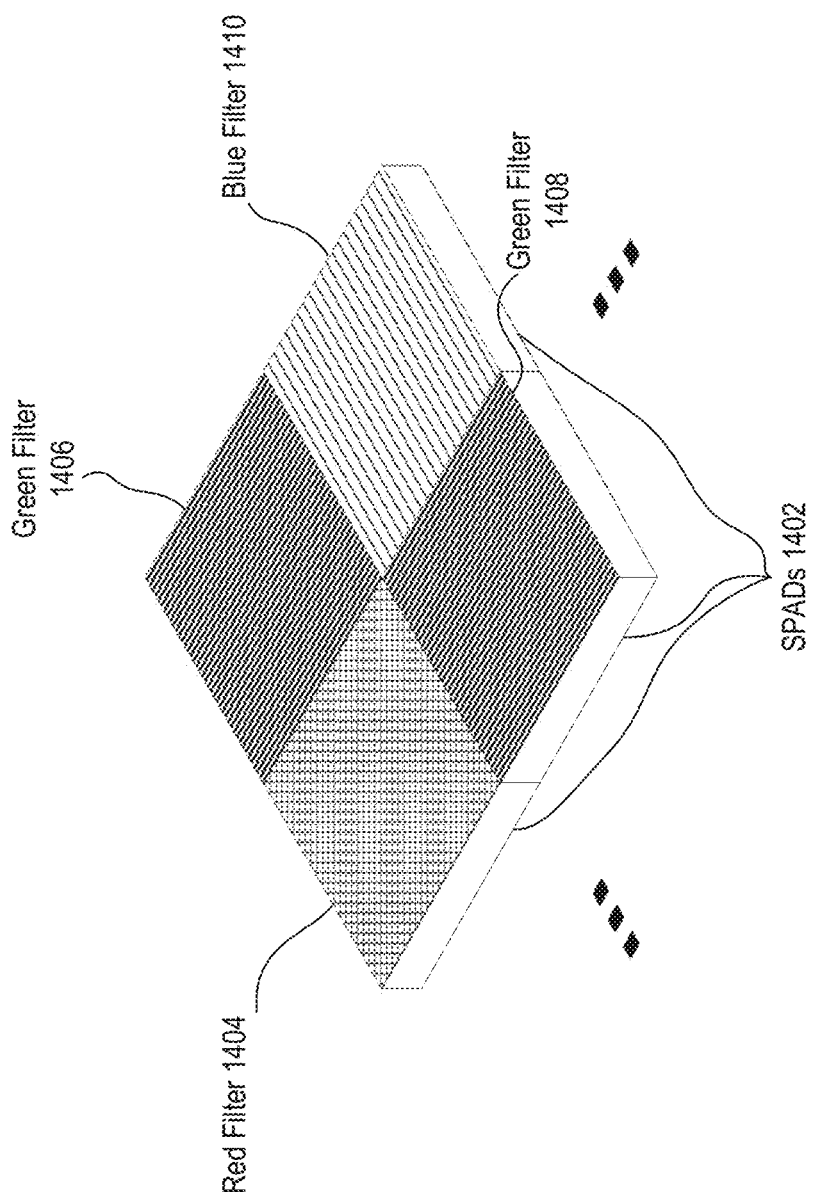
FIG. 14 illustrates example SPAD pixels of a SPAD array that include color filters.

Attention is now directed to FIG. 14 illustrates an example implementation of SPADs 1402 of a SPAD array (e.g., SPAD array 112). A SPAD array may comprise any number of SPADs 1402, as indicated by the ellipses in FIG. 14. In the example shown in FIG. 14, the SPADs each comprise respective color filters positioned thereover (e.g., over the photon sensing portion of the SPADs 1402). FIG. 14 illustrates the color filters positioned over the SPADs 1402 in a Bayer pattern, in particular with diagonally disposed green filters 1406 and 1408 and with a diagonally disposed red filter 1404 and blue filter 1410. This pattern may be repeated over a SPAD array to form a mosaic of color-filtered SPAD pixels. Although the examples disclosed herein focus, in at least some respects, on color-filtered SPADs 1402 of a SPAD array arranged in a Bayer pattern, other patterns are within the scope of the present disclosure, such as by way of non-limiting example, CYGM (cyan, yellow, green magenta), RGBE (red, green, blue, emerald), Foveon X3 (e.g., a vertically arranged red, green, blue pattern), panchromatic cell patterns (e.g., RGBW (red, green, blue, white), CMYW (cyan, magenta, yellow, white), Fujifilm EXR, Fujifilm X-Trans, Quad Bayer)), and/or others.

Figure 15:
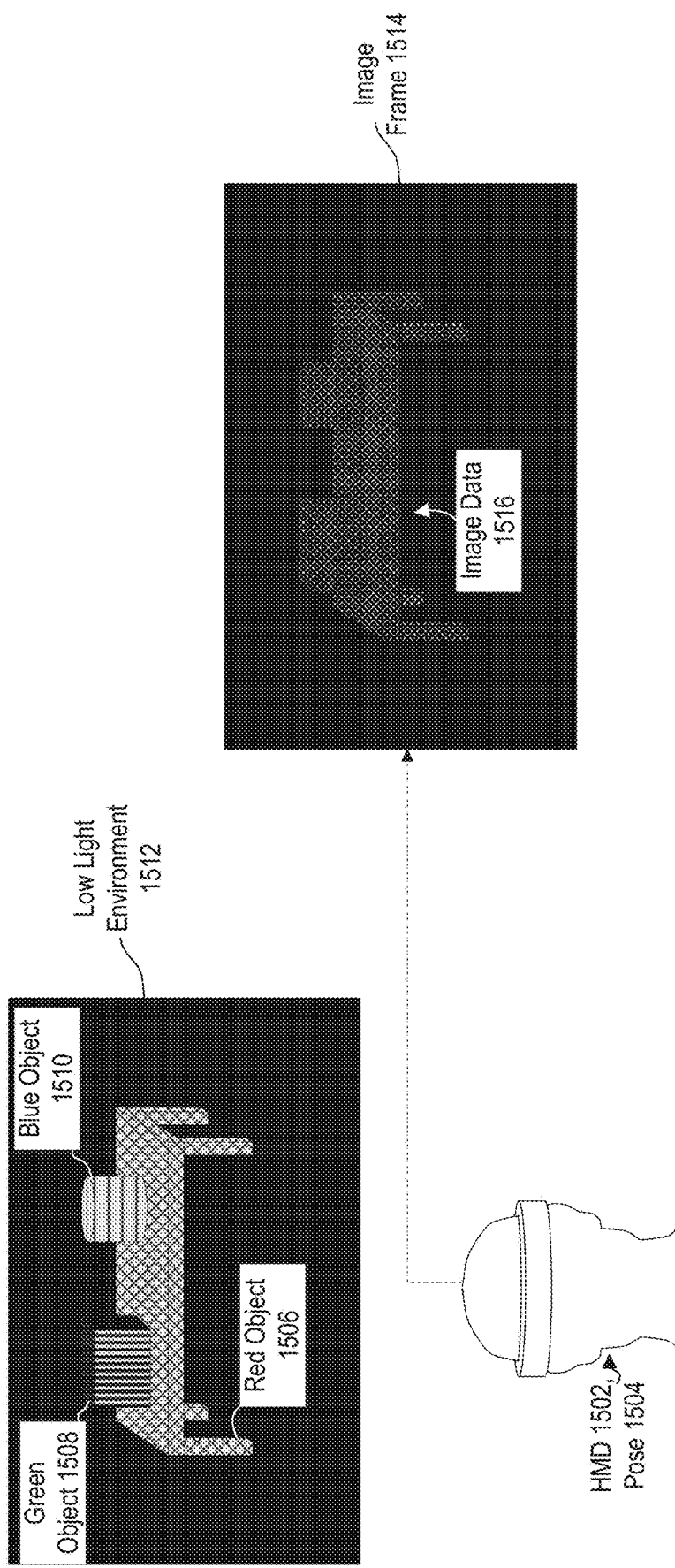
FIG. 15 illustrates an example of capturing an image frame of colored objects in a low light environment using a color filtered SPAD array of an HMD.

FIG. 15 illustrates an example of capturing an image frame of colored objects in a low light environment using a color-filtered SPAD array of an HMD. In particular, FIG. 15 illustrates an HMD 1502, which corresponds, in at least some respects, to the system 100 described hereinabove. For example, the HMD may include a SPAD array (e.g., SPAD array 112) comprising SPADs (e.g., SPADs 1402) with color filters arranged in a Bayer pattern (e.g., as illustrated in FIG. 14). In the example shown in FIG. 15, the HMD 1502 is positioned according to pose 1504 while capturing an image frame 1514 of a red object 1506 (e.g., a table) a green object 1508 (e.g., a box), and a blue object 1510 (e.g., a can) in a low light environment 1512. The pose 1504 may be tracked or measured utilizing sensors (e.g., IMU(s) 114, camera(s) to facilitate SLAM, etc.) of the HMD 1502.

FIG. 15 illustrates that the image frame 1514 includes image data 1516 captured by the color filtered SPADs of the HMD 1502. The image data 1516 of the image frame 1514 may, under conventional systems, be demosaiced (e.g., based on the pattern of the color filters on the SPADs) to interpolate RGB color values for each SPAD pixel (or image pixel of the image frame 1514 captured by a SPAD pixel) to generate a color image. However, as is evident from FIG. 15, the image data 1516 of the image frame 1514 provides noisy representations of the captured objects, which may occur, in some instances, when imaging under low light conditions (e.g., about 1 millilux or below) due to the low number of photons detected by SPAD pixels over the frame capture time period for capturing the image frame 1514. As noted above, performing demosaicing on image data that includes significant noise may result in poor quality color images. The following discussion refers to various techniques that may be employed to reduce noise in SPAD imagery captured using color-filtered SPADs in preparation for performing demosaicing to obtain color imagery.

Figure 16:
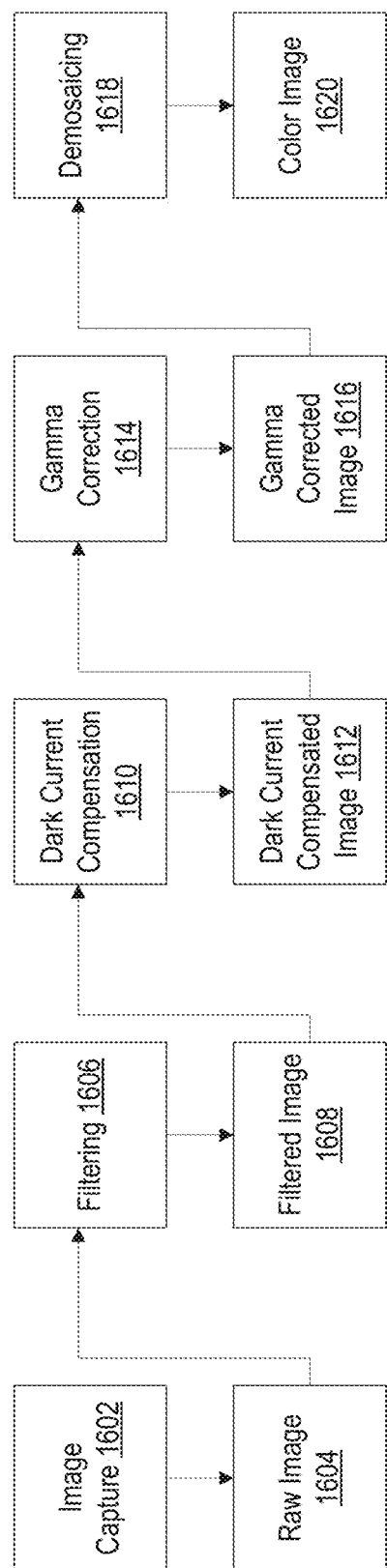
FIG. 16 illustrates an example processing pipeline for obtaining color images using a SPAD array.

FIG. 16 illustrates an example processing pipeline for obtaining color images using a SPAD array. In particular, FIG. 16 illustrates an example pipeline in which image capture 1602 is performed to generate a raw image 1604 (e.g., similar to image frame 1514). FIG. 16 also illustrates filtering 1606 performed to generate a filtered image 1608. The filtering 1606 may comprise performing temporal filtering and/or spatial filtering. Additional details concerning filtering for generating a filtered image in preparation for performing demosaicing will be provided hereinafter. In some instances, the pipeline for obtaining color imagery includes dark current compensation 1610 to generate a dark current compensated image 1612 (e.g., as discussed hereinabove with reference to FIGS. 2-13).

The pipeline may also include gamma correction 1614 to generate a gamma corrected image 1616. Gamma correction 1614 may comprise raising input values (e.g., intensity values) to a power of a gamma value (and multiplying the input values by a constant) to provide output values. Gamma correction 1614 may optimize imagery for the non-linear manner in which humans perceive light and color. Gamma correction 1614 may have the effect of causing dark pixels to appear darker and causing bright pixels to appear brighter. Accordingly, gamma correction, if performed prematurely, can degrade the benefits provided by other operations such as temporal filtering. Accordingly, gamma correction 1614 may be performed after filtering 1606 but prior to demosaicing.

FIG. 16 also illustrates demosaicing 1618 performed subsequent to the other operations of the pipeline for generating a color image 1620. As noted above, demosaicing may comprise interpolating or extrapolating a color value (e.g., an RGB value) for each image pixel (or SPAD pixel) of an image frame (or a SPAD array that captures an image frame). In contrast with generating a single color value for each block of Bayer pixels (e.g., each 2×2 set of RGB pixels) to generate a color image (thereby causing an image resolution loss), demosaicing may provide RGB color imagery without loss of image resolution. However, as noted above, demosaicing may add or boost image noise, particularly when performed on image data that already includes noise. Accordingly, the pipeline of FIG. 16 illustrates performing demosaicing 1618 subsequent to filtering 1606 and other image frame preparation operations.

It should be noted that, in some embodiments, fewer than all of the operations of the pipeline illustrated in FIG. 16 are performed to generate color imagery. For example, in some instances, dark current compensation 1610 and/or gamma correction 1614 are not performed for generating a color image 1620.

The discussion that attends FIGS. 17-20 is related to filtering 1606 that may be performed on raw imagery in preparation for demosaicing 1618 to generate a color image 1620. As noted above, filtering 1606 may comprise temporal filtering and/or spatial filtering. The discussion that attends FIGS. 17-18C relates to temporal filtering, whereas the discussion that attends FIGS. 19 and 20 relates to spatial filtering.

Figure 17:
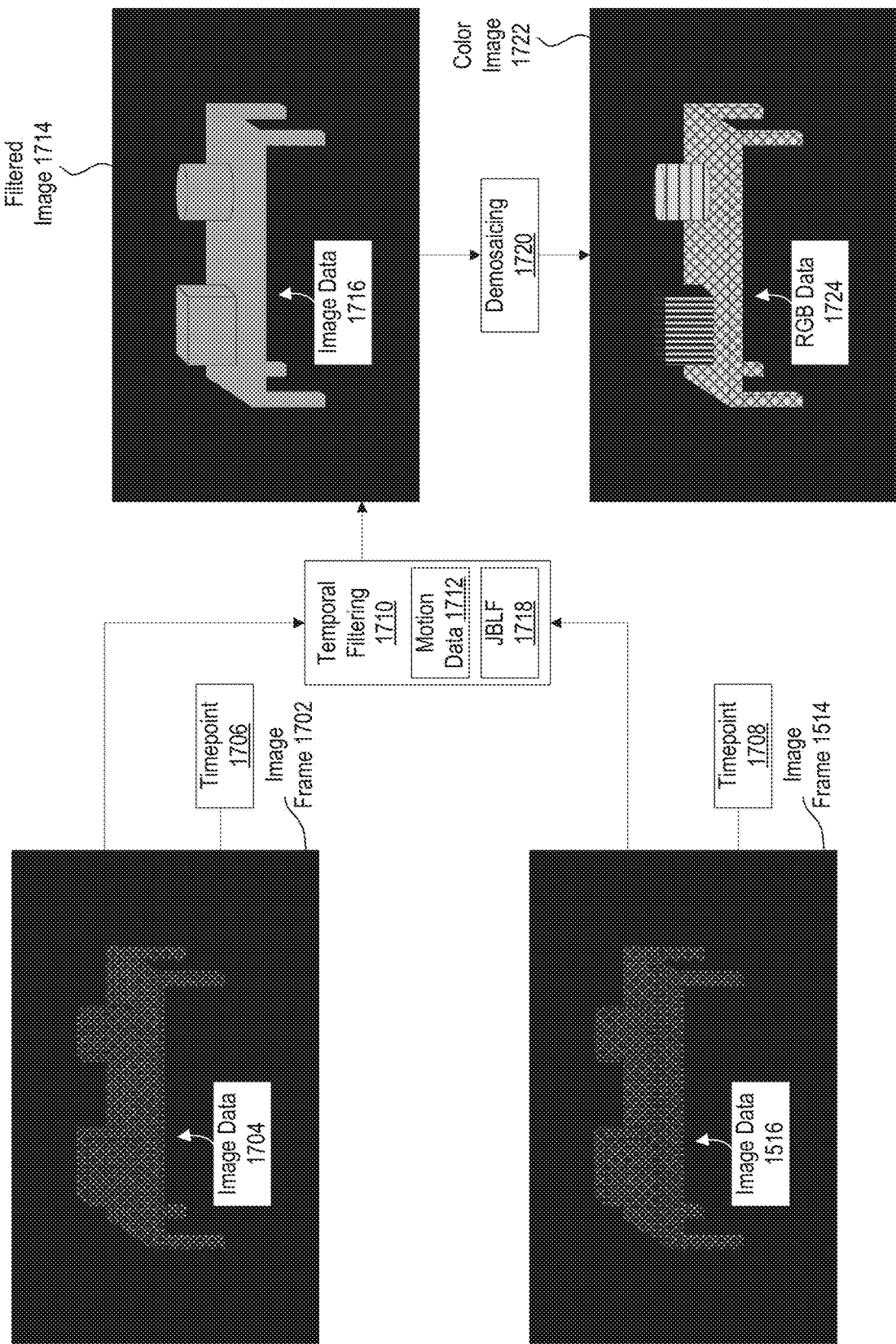
FIG. 17 illustrates an example of generating a filtered image by performing temporal filtering on an image frame prior to demosaicing.

FIG. 17 illustrates an example of generating a filtered image by performing temporal filtering on image frames that are consecutively captured using a color filtered SPAD array (e.g., a color filtered SPAD array of an HMD 1502). In particular, FIG. 17 shows the image frame 1514 (and its image data 1516 captured using color filtered SPADS), as well as an additional image frame 1702 (e.g., captured by the HMD 1502). The additional image frame 1702 includes image data 1704 depicting the red object 1506, the green object 1508, and the blue object 1510. Similar to image frame 1514, image frame 1702 may comprise a raw image captured by color filtered SPADs upon which no demosaicing has been performed.

FIG. 17 also indicates that the different image frames 1514 and 1702 are captured at different timepoints. In particular, FIG. 17 indicates that image frame 1702 was captured at timepoint 1706 and that image frame 1514 was captured at timepoint 1708. In the present example, timepoint 1706 temporally precedes timepoint 1708.

As indicated above, image data of consecutively captured image frames may be combined to form a composite image to facilitate adequate exposure of objects captured within the image frames (e.g., particularly under low light conditions). Accordingly, FIG. 17 illustrates temporal filtering 1710 performed on the image frames 1702 and 1514 to generate a filtered image 1714. Temporal filtering 1710 includes combining corresponding image pixels of the different image frames 1702 and 1514 to generate pixel values for an output image (i.e., filtered image 1714).

As noted above, corresponding image pixels of the different image frames 1702, 1514 may be combined or composited in various ways, such as by summing, averaging (e.g., weighted averaging), alpha blending, and/or others, and the manner/parameters of combining corresponding image pixels may differ for different pixel regions and/or may be dynamically determined based on various factors (e.g., signal strength, amount of motion, motion detected in a captured scene, etc.).

In some instances, image frames 1702 and 1514 capture environmental objects from poses that are at least slightly different from one another. For example, the HMD 1502 may capture image frame 1702 from a pose that at least slightly differs from pose 1504. Accordingly, in some instances, to align corresponding pixels of different image frames 1702 and 1514, temporal filtering 1710 may utilize motion data 1712, which may comprise or be used to generate pose data that describes the position and/or orientation (e.g., 6 degrees of freedom pose) and/or change of position (e.g., velocity and/or acceleration) and/or change of orientation (e.g., angular velocity and/or angular acceleration) of the HMD 1502 during the capturing of the image frames 1702 and 1514.

The motion data 1712 may be used to align the image frames 1702 and 1514 with one another. For example, a system may use the motion data 1712 to align image frame 1702 with pose 1504 of image frame 1514, thereby generating aligned image frames that are spatially aligned with one another (e.g., appearing as though they were all captured from pose 1504 with the same capture perspective). In this regard, the temporal filtering 1710 may comprise motion compensated temporal filtering. In some instances, temporal filtering 1710 additionally or alternatively utilizes optical flow estimations to align the image frames 1702 and 1514.

Additionally, or alternatively, temporal filtering 1710 may utilize a joint bilateral filter 1718 (JBLF 1718) using the image frame 1514 and the image frame 1702 (i.e., the preceding image frame). For instance, the JBLF 1718 may utilize the image frame 1514 as a guidance image to cause the output filtered image 1714 to be in the geometry of the image frame 1514. By way of example, a JBLF 1718 may utilize a three-dimensional kernel (e.g., a 3×3×2 kernel) to define each pixel value for the output image (e.g., filtered image 1714) based on neighboring pixel values in both image frames 1514 and 1702. Neighboring pixels within a pixel window that are near the pixel value of the center pixel (e.g., the current pixel under analysis for generating an output pixel according to the kernel) may be given additional weight in the calculation of the pixel value of the center pixel for the output image (e.g., filtered image 1714). For example, when the center pixel is one captured by a red filtered SPAD pixel, the JBLF 1718 may give greater weight to the intensity values of neighboring red filtered SPAD pixels (in both image frames 1702 and 1514) and give lesser weight to the intensity values of neighboring green or blue filtered SPAD pixels when calculating the output value for the center pixel. In this way, a JBLF 1718 may be used to composite the image frames 1702 and 1514 in a manner that accounts for the different color channels of the SPADs. Although not illustrated in FIG. 17, a JBLF 1718 may also utilize subsequent timepoint image frames to generate a filtered image 1714 (e.g., utilizing a 3×3×3 kernel).

FIG. 17 conceptually depicts that the image data 1716 of the filtered image 1714 comprises reduced noise (e.g., relative to the image frames 1702 and 1514). Thus, the filtered image 1714 may provide a superior basis for generating a color image via demosaicing (e.g., relative to the image frames 1702 and/or 1514). FIG. 17 thus illustrates demosaicing 1720 performed on the filtered image 1714 to generate a color image (as noted above, additional operations may be performed on the filtered image 1714 prior to demosaicing 1720, such as dark current compensation, gamma correction, etc.). Demosaicing 1720 may utilize the color filter pattern of the SPADs of the system (e.g., the HMD 1502) and image data 1716 (i.e., intensity values) obtained using the color filtered SPAD pixels to determine RGB data 1724 of the color image 1722. As depicted in FIG. 17, the color image 1722 depicts the various objects of the environment with their respective colors (and without resolution loss relative to the filtered image 1714 used as input for the demosaicing 1720).

In some implementations, where motion compensated temporal filtering is implemented, mixed pixels may occur. That is, when motion data (e.g., motion data 1712) is used to align image frames, some image pixels captured by SPADs associated with different color channels (e.g., a red pixel and a blue pixel) may be caused to overlap with one another. Pixel mixing can cause image data associated with different color channels to be composited to form a filtered image, which can degrade the output of the temporal filtering 1710.

Figure 18A:
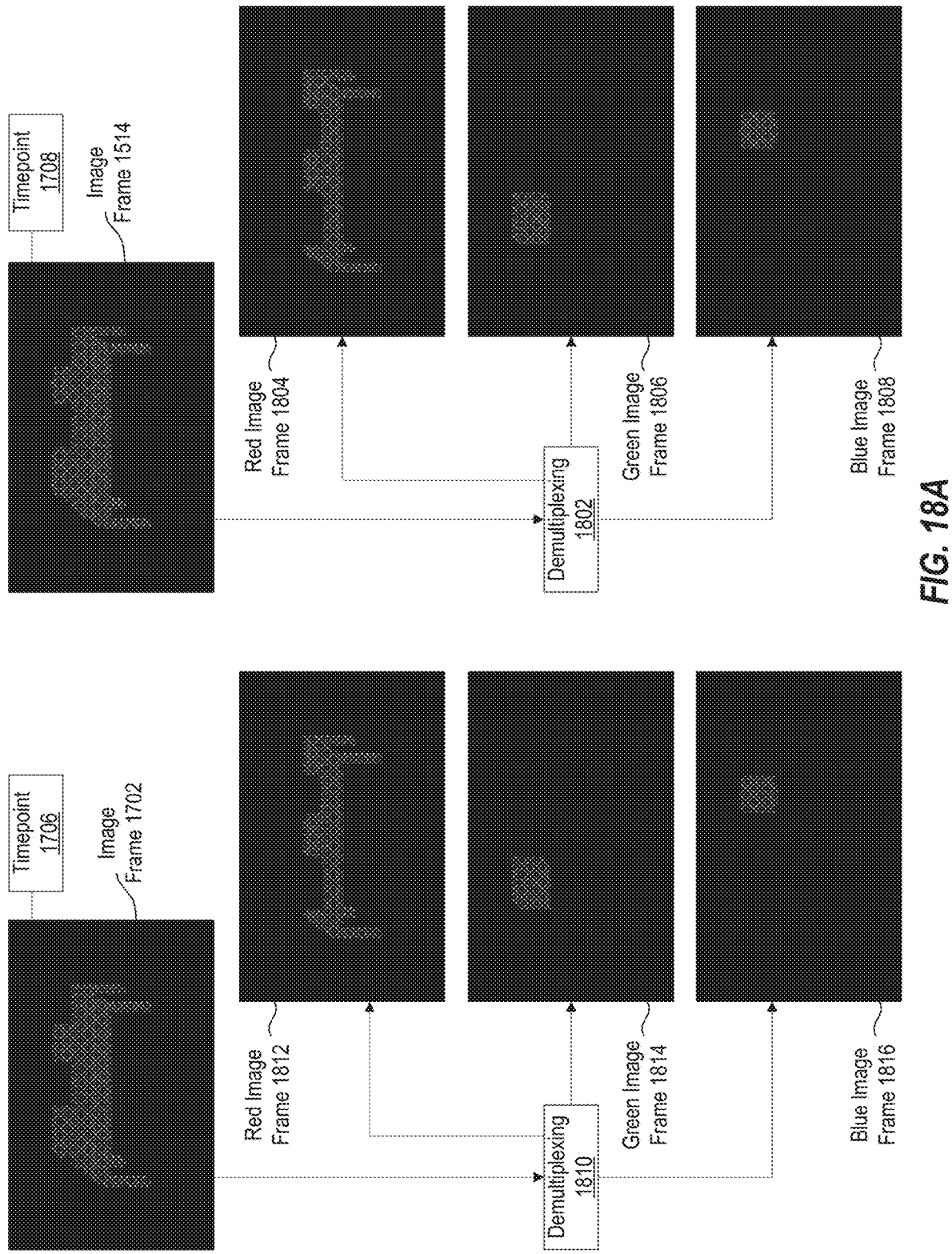
FIG. 18A illustrates an example of demultiplexing consecutively captured image frames to generate color-specific image frames at multiple timepoints.

Accordingly, in some implementations, separate temporal filtering operations are performed for image data captured by SPADs associated with different color filters. To illustrate, FIG. 18A shows an example of demultiplexing consecutively captured image frames to generate color-specific image frames at multiple timepoints. In particular, FIG. 18A illustrates the image frames 1702 and 1514 captured at the consecutive timepoints 1706 and 1708 discussed above. FIG. 18A further illustrates demultiplexing 1810 and 1802 performed on the image frames 1702 and 1514, respectively. Demultiplexing 1810 and 1802 may comprise separating the image frames 1702 and 1514 according to the separate channels present in the image frames 1702 and 1514. For instance, according to the present example, the SPADs 1402 of the HMD 1502 used to capture the image frames 1702 and 1514 includes SPADs include red filters 1404, green filters 1406, and blue filters 1410 (e.g., arranged in a Bayer pattern). Thus, demultiplexing 1810 and 1802 may include separating the image frames 1702 and 1514 into respective red image frames, green image frames, and blue image frames.

FIG. 18A illustrates a red image frame 1812, a green image frame 1814, and a blue image frame 1816 (e.g., "demultiplexed image frames") resulting from performing demultiplexing 1810 on the image frame 1702. Similarly, FIG. 18A illustrates a red image frame 1804, a green image frame 1806, and a blue image frame 1808 resulting from performing demultiplexing 1802 on image frame 1514. The separate, color-specific image frames resulting from the demultiplexing 1810 and 1802 include image data representing intensity values detected through the separate color filters. For example, the red image frames 1812 and 1804 include image data depicting the red object 1506 and omitting the green object 1508 and the blue object 1510, the green image frames 1814 and 1806 include image data depicting the green object 1508 and omitting the red object 1506 and the blue object 1510, and the blue image frames 1816 and 1808 include image data depicting the blue object 1510 and omitting the red object 1506 and the green object 1508. By generating separate demultiplexed image frames for separate color channels, temporal filtering may be performed in a manner that substantially avoids pixel mixing.

Figure 18B:
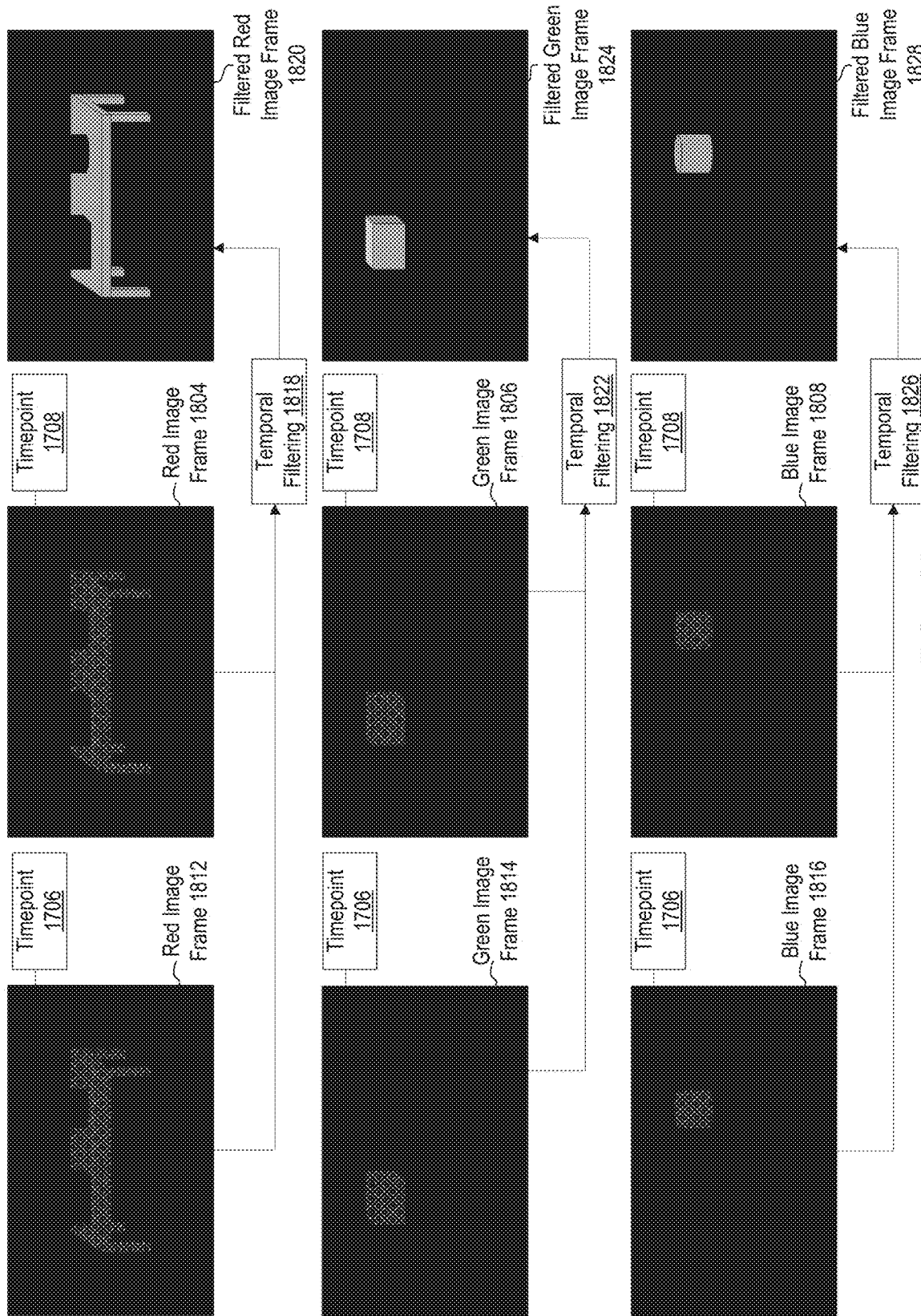
FIG. 18B illustrates an example of generating filtered color-specific image frames by performing temporal filtering using color-specific image frames associated with different timepoints.

FIG. 18B illustrates an example of generating filtered color-specific image frames by performing temporal filtering using color-specific image frames associated with different timepoints. In particular, FIG. 18B illustrates temporal filtering 1818 performed to composite the red image frame 1812 (e.g., derived from image frame 1702 and associated with timepoint 1706) and the red image frame 1804 (e.g., derived from image frame 1514 and associated with timepoint 1708) to generate a filtered red image frame 1820. FIG. 18B also shows temporal filtering 1822 performed to composite the green image frame 1814 (e.g., derived from image frame 1702 and associated with timepoint 1706) and the green image frame 1806 (e.g., derived from image frame 1514 and associated with timepoint 1708) to generate a filtered green image frame 1824. Similarly, FIG. 18B illustrates temporal filtering 1826 performed to composite the blue image frame 1816 (e.g., derived from image frame 1702 and associated with timepoint 1706) and the blue image frame 1808 (e.g., derived from image frame 1514 and associated with timepoint 1708) to generate a filtered blue image frame 1828.

As is evident from FIG. 18B, the filtered image frames (e.g., filtered red image frame 1820, filtered green image frame 1824, and filtered blue image frame 1828) comprise representations of the captured objects with reduced noise (e.g., relative to the individual representations of the captured objects in the red image frames 1812, 1804, green image frames 1814, 1806, or blue image frames 1816, 1808). The reduction in noise can be achieved in a manner that mitigates the risk of pixel mixing during temporal filtering (e.g., by demultiplexing the captured image frames and performing per-color channel temporal filtering). The filtered image frames may be combined to form a combined or composite filtered image, which may then be used for demosaicing to form a color image.

Figure 18C:
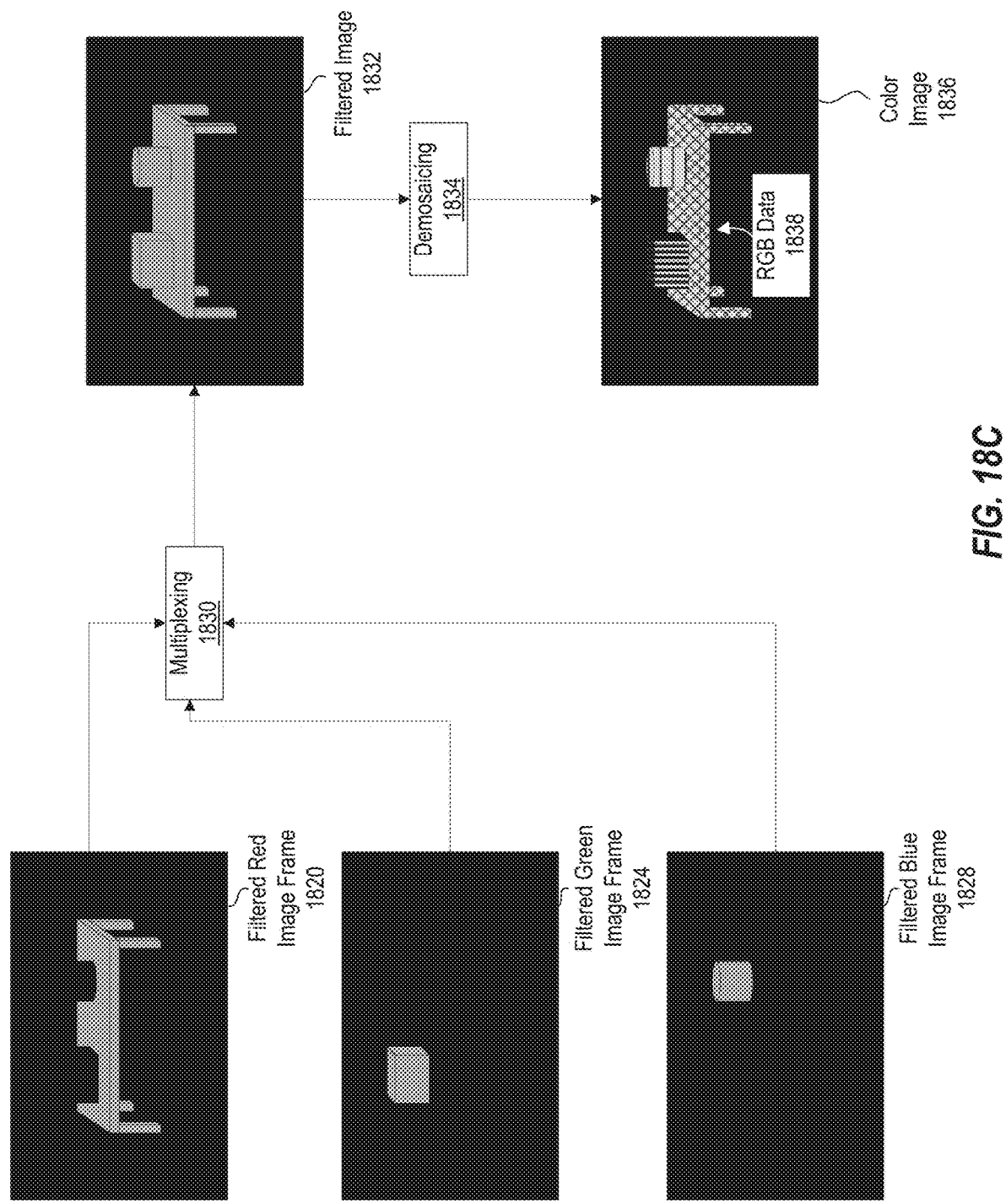
FIG. 18C illustrates an example of multiplexing filtered color-specific image frames to generate a filtered image.

FIG. 18C illustrates an example of multiplexing filtered color-specific image frames to generate a filtered image. In particular, FIG. 18C illustrates multiplexing 1830 used to combine the filtered red image frame 1820, the filtered green image frame 1824, and the filtered blue image frame 1828. FIG. 18C illustrates a filtered image 1832 as the output of the multiplexing 1830. The multiplexing may comprise arranging the image data (e.g., pixel values) of the filtered red image frame 1820, the filtered green image frame 1824, and the filtered blue image frame 1828 in a single image (e.g., according to the Bayer pattern or other pattern of the SPADs that detected the image frames used to form the filtered color-specific image frames).

Because the filtered image 1832 is generated using the filtered color-specific image frames (e.g., the filtered red image frame 1820, the filtered green image frame 1824, and the filtered blue image frame 1828), the filtered image 1832 also depicts the captured objects with reduced noise (e.g., relative to relative to the individual representations of the captured objects in the red image frames 1812, 1804, green image frames 1814, 1806, or blue image frames 1816, 1808). Accordingly, the filtered image 1832 may provide an improved basis for performing demosaicing to form a color image (e.g., relative to raw images captured by the SPADs).

FIG. 18C illustrates demosaicing 1834 performed using the filtered image 1832 to form a color image 1836. As noted above, demosaicing comprises interpolating or extrapolating RGB values for the image pixels of an input image (e.g., the filtered image 1832). Accordingly, FIG. 18C illustrates RGB data 1838 of the color image, which depicts the colored objects (e.g., red object 1506, green object 1508, and blue object 1510) using RGB values to allow users to perceive the colors of the captured objects when viewing the color image 1836. Thus, implementations of the present disclosure may facilitate color image acquisition using SPADs in a manner that reduces noise, thereby allowing for color image capture in low light environments.

As noted above with reference to FIG. 16, the filtering 1606 performed to form a filtered image 1608 prior to demosaicing 1618 may additionally or alternatively include spatial filtering. However, many conventional spatial filters may cause neighboring image data captured by SPADs that have different color filters to be blended or filtered together (e.g., a simple averaging filter thus is not well-suited for such implementations). Thus, techniques of the present disclosure include spatial filtering processes that account for multiplexed pixels associated with different colors.

Figure 19:
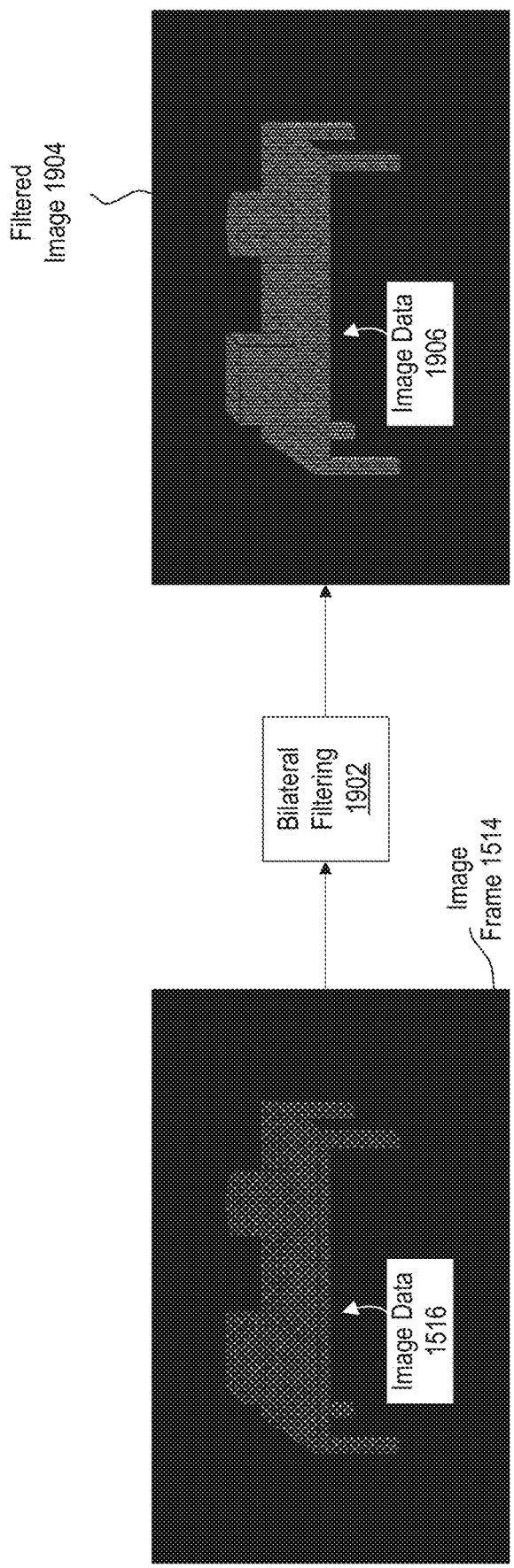
FIG. 19 illustrates an example of generating a filtered image by performing bilateral filtering on an image frame prior to demosaicing.

FIG. 19 illustrates an example of generating a filtered image by performing bilateral filtering on an image frame prior to demosaicing. In particular, FIG. 19 illustrates the image frame 1514 and the image data thereof 1516 (e.g., captured using color filtered SPADs 1402 of an HMD 1502). FIG. 19 shows bilateral filtering 1902 performed on the image frame 1514 to generate a filtered image 1904 with corresponding image data 1906. Bilateral filtering 1902 may comprise utilizing a two-dimensional kernel (e.g., a 3×3 kernel) to define each pixel value for the output image (e.g., filtered image 1904) based on neighboring pixel values in the image frame 1514. Similar to the JBLF discussed above, bilateral filtering 1902 may give additional weight to neighboring pixel values that are near the value of the pixel for which an output value is currently being determined (e.g., the center pixel of the kernel). Thus, when determining an output value for a particular image pixel captured by a red filtered SPAD, bilateral filtering 1902 may give additional weight for determining the output value to pixels within the pixel window surrounding the particular image pixel that have a similar intensity to the particular image pixel (e.g., pixels that are also captured by red filtered SPADs).

Bilateral filtering 1902 may preserve edges while reducing noise. Thus, bilateral filtering 1902 may provide various benefits while mitigating the effects of image pixels in a filtered image being influenced by image pixels associated with different colors. Thus, performing bilateral filtering 1902 prior to demosaicing may improve the quality of the filtered image 1904 for generating a color image.

Figure 20:
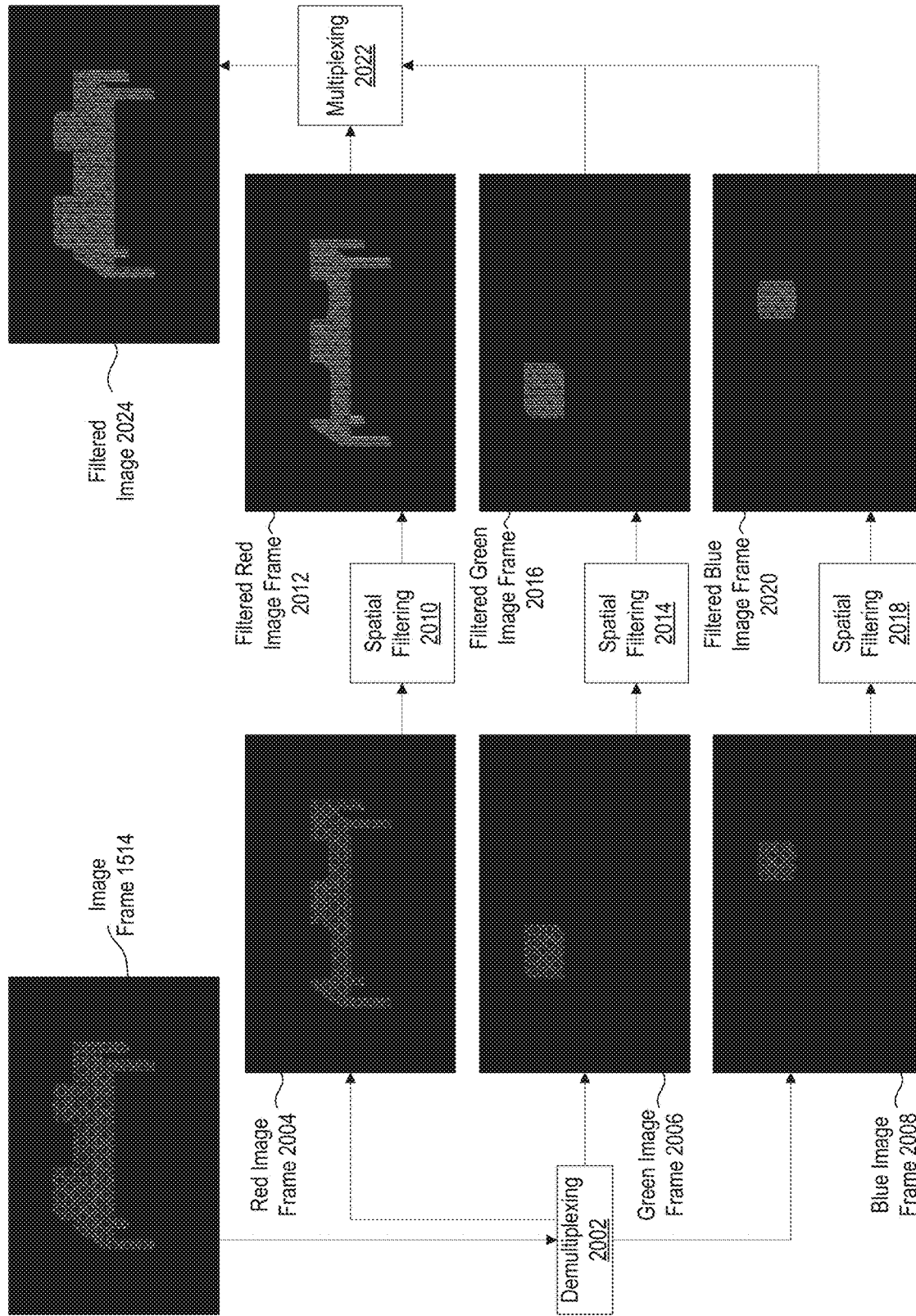
FIG. 20 illustrates an example of demultiplexing an image frame to generate color-specific image frames, generating filtered color-specific image frames by performing spatial filtering on the color-specific image frames, and multiplexing the filtered color-specific image frames to generate a filtered image.

Additional techniques are within the scope of the present disclosure to facilitate spatial filtering in a manner that accommodates the different color filters associated with neighboring SPAD pixels. For example, FIG. 20 illustrates an example of demultiplexing the image frame 1514 to generate color-specific image frames (i.e., red image frame 2004, green image frame 2006, and blue image frame 2008). Demultiplexing 2002 corresponds generally to demultiplexing 1810 and 1802 discussed hereinabove with reference to FIG. 18A. By demultiplexing the image frame 1514 to generate color-specific image frames associated with different color channels (e.g., "demultiplexed image frames"), spatial filtering operations may be performed separately for different color channels to prevent the spatial filtering operations from causing neighboring pixels associated with different colors to blend together.

Accordingly, FIG. 20 illustrates spatial filtering 2010 performed on red image frame 2004 to generate filtered red image frame 2012, spatial filtering 2014 performed on green image frame 2006 to generate filtered green image frame 2016, and spatial filtering 2018 performed on blue image frame 2008 to generate filtered blue image frame 2020. The spatial filtering 2010, 2014, and/or 2018 may comprise various operations for smoothing noise, preserving edges, and/or otherwise improving the input image frames (e.g., red image frame 2004, green image frame 2006, and blue image frame 2008). For example, one or more of spatial filtering 2010, 2014 and/or 2018 may comprise a mean filter, a Gaussian filter, an order statistics filter, a median filter, a Laplacian filter, a gradient filter, and/or others. Furthermore, the spatial filtering operations applied to the different color-specific input images may at least partially differ from one another.

FIG. 20 also illustrates multiplexing 2022 performed using the filtered red image frame 2012, the filtered green image frame 2016, and the filtered blue image frame 2020 to generate a filtered image 2024. Multiplexing 2022 may generally correspond to the multiplexing 1830 discussed hereinabove with reference to FIG. 18C. The filtered image 2024 may be used as a basis for performing demosaicing or other operations prior to demosaicing (e.g., temporal filtering, dark current compensation, gamma correction, etc.). Furthermore, in some implementations, the principles related to spatial filtering discussed herein are performed on images that have been temporally filtered.

Additional operations may be performed on a color image generated via demosaicing, such as reprojection to generate a parallax-corrected color image and/or presentation on a display of an HMD.

Example Method(s) for Obtaining Color Imagery Using SPADs

Figure 21:
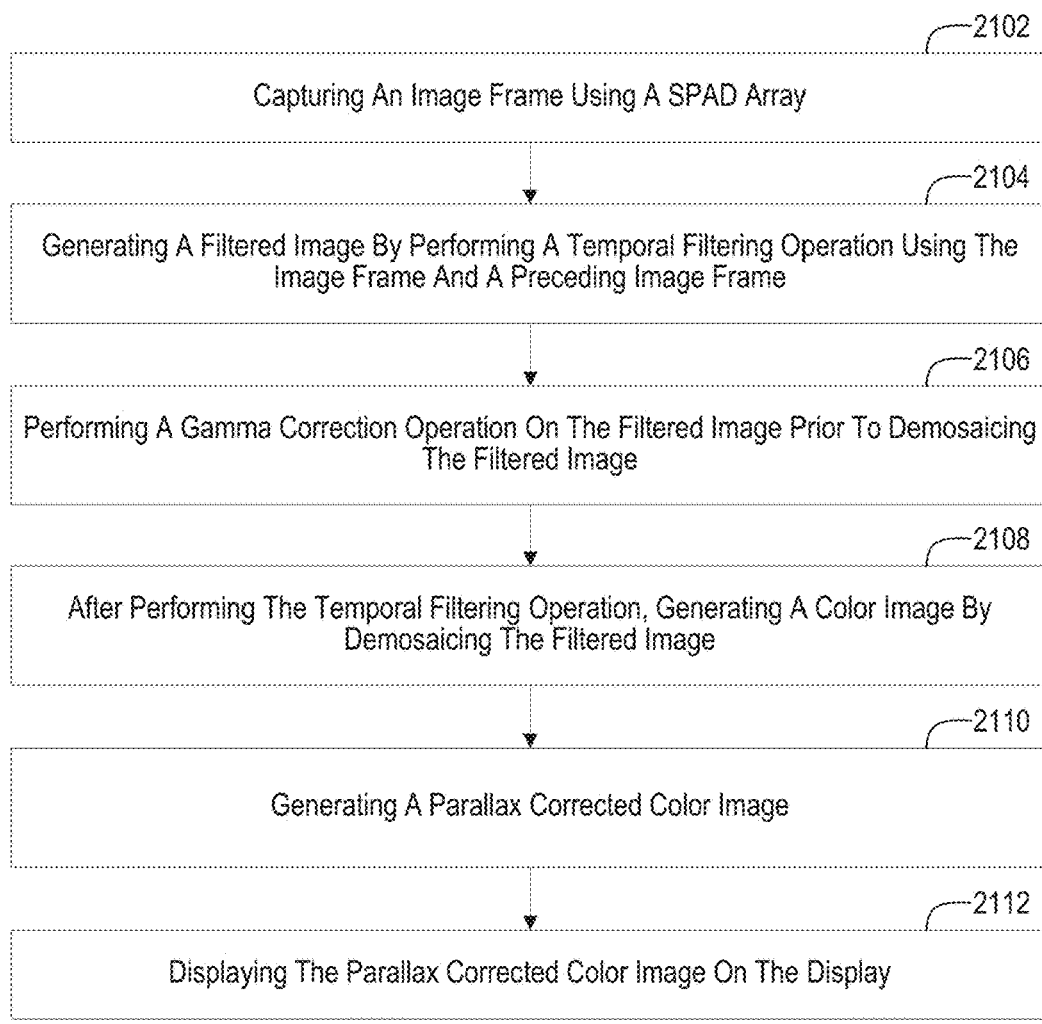
FIGS. 21 and 22 illustrate example flow diagrams depicting acts associated with obtaining color imagery using SPADs.
Figure 22:
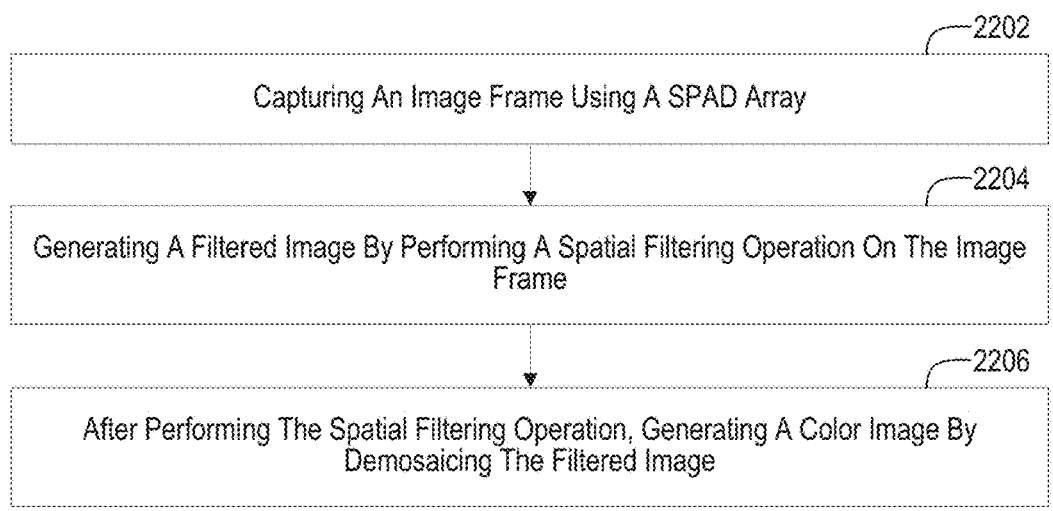

FIGS. 21 and 22 illustrate example flow diagrams 2100 and 2200, respectively, depicting acts associated with obtaining color imagery using SPADs.

Act 2102 of flow diagram 2100 of FIG. 21 includes capturing an image frame using a SPAD array. Act 2102 is performed, in some instances, by a system utilizing processor(s) 102, storage 104, sensor(s) 110 (e.g., SPAD array 112 comprising color filtered SPAD pixels 1402), input/output system(s) 116, communication system(s) 118, and/or other components. In some implementations, the respective color filters covering the plurality of SPAD pixels are arranged in a Bayer pattern.

Act 2104 of flow diagram 2100 includes generating a filtered image by performing a temporal filtering operation using the image frame and a preceding image frame. Act 2104 is performed, in some instances, by a system utilizing processor(s) 102, storage 104, sensor(s) 110, input/output system(s) 116, communication system(s) 118, and/or other components. The preceding image frame may be captured by the SPAD array at a timepoint that temporally precedes a timepoint associated with the image frame. In some instances, the preceding image frame includes a raw image frame on which no demosaicing has been performed. Furthermore, in some instances, performing the temporal filtering operation includes (i) generating an aligned preceding image frame by using motion data associated with the SPAD array to spatially align the preceding image frame with the image frame and (ii) compositing the image frame with the aligned preceding image frame.

In some implementations, performing the temporal filtering operation comprises applying a joint bilateral filter to the image frame and the preceding image frame. In some implementations, performing the temporal filtering operation comprises applying the joint bilateral filter to the image frame and a subsequent image frame. The subsequent image frame is captured at a timepoint that is temporally subsequent to the timepoint associated with the image frame.

In some instances, performing the temporal filtering operation includes (i) generating a plurality of demultiplexed image frames by demultiplexing the image frame where each of the plurality of demultiplexed image frames is associated with a respective color channel, (ii) accessing a plurality of demultiplexed preceding image frames, and (iii) generating a plurality of temporally filtered demultiplexed image frames by, for each particular demultiplexed image frame of the plurality of demultiplexed image frames: (a) generating a corresponding aligned demultiplexed preceding image frame by using motion data associated with the SPAD array to align the corresponding demultiplexed preceding image frame with the particular demultiplexed image frame, and (b) compositing the particular demultiplexed image frame with the corresponding aligned demultiplexed preceding image frame. The plurality of demultiplexed preceding image frames may be generated by demultiplexing the preceding image frame, and the plurality of demultiplexed preceding image frames may include, for each particular demultiplexed image frame of the plurality of demultiplexed image frames, a corresponding demultiplexed preceding image frame associated with a same color channel as the particular demultiplexed image frame.

In some implementations, generating the filtered image comprises multiplexing the plurality of temporally filtered demultiplexed image frames.

Act 2106 of flow diagram 2100 includes performing a gamma correction operation on the filtered image prior to demosaicing the filtered image. Act 2106 is performed, in some instances, by a system utilizing processor(s) 102, storage 104, sensor(s) 110, input/output system(s) 116, communication system(s) 118, and/or other components.

Act 2108 of flow diagram 2100 includes after performing the temporal filtering operation, generating a color image by demosaicing the filtered image. Act 2108 is performed, in some instances, by a system utilizing processor(s) 102, storage 104, sensor(s) 110, input/output system(s) 116, communication system(s) 118, and/or other components.

Act 2110 of flow diagram 2100 includes generating a parallax corrected color image. Act 2110 is performed, in some instances, by a system utilizing processor(s) 102, storage 104, sensor(s) 110, input/output system(s) 116, communication system(s) 118, and/or other components.

Act 2112 of flow diagram 2100 includes displaying the parallax corrected color image on the display. Act 2112 is performed, in some instances, by a system utilizing processor(s) 102, storage 104, sensor(s) 110, input/output system(s) 116, communication system(s) 118, and/or other components.

Act 2202 of flow diagram 2100 of FIG. 22 includes capturing an image frame using a SPAD array. Act 2202 is performed, in some instances, by a system utilizing processor(s) 102, storage 104, sensor(s) 110 (e.g., SPAD array 112 comprising color filtered SPAD pixels 1402), input/output system(s) 116, communication system(s) 118, and/or other components. In some instances, the respective color filters covering the plurality of SPAD pixels are arranged in a Bayer pattern.

Act 2204 of flow diagram 2100 includes generating a filtered image by performing a spatial filtering operation on the image frame. Act 2204 is performed, in some instances, by a system utilizing processor(s) 102, storage 104, sensor(s) 110, input/output system(s) 116, communication system(s) 118, and/or other components. In some instances, performing the spatial filtering operation comprises applying a bilateral filter to the image frame. In some instances, performing the spatial filtering operation includes (i) generating a plurality of demultiplexed image frames by demultiplexing the image frame where each of the plurality of demultiplexed image frames is associated with a respective color channel (ii) generating a plurality of spatially filtered demultiplexed image frames by applying a respective spatial filtering operation to each of the plurality of demultiplexed image frames. The respective spatial filtering operation may include one or more of a mean filter, a Gaussian filter, an order statistics filter, a median filter, a Laplacian filter, or a gradient filter. In some instances, generating the filtered image comprises multiplexing the plurality of spatially filtered demultiplexed image frames.

Act 2206 of flow diagram 2100 includes, after performing the spatial filtering operation, generating a color image by demosaicing the filtered image. Act 2206 is performed, in some instances, by a system utilizing processor(s) 102, storage 104, sensor(s) 110, input/output system(s) 116, communication system(s) 118, and/or other components.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "physical computer storage media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A system for compensating for dark current in single photon avalanche diode (SPAD) imagery, the system comprising:
   a SPAD array comprising a plurality of SPAD pixels;
   one or more processors; and
   one or more hardware storage devices storing instructions that are executable by the one or more processors to configure the system to:
      capture an image frame with the SPAD array;
      generate a temporally filtered image by performing a temporal filtering operation based on the image frame and at least one preceding image frame, the at least one preceding image frame having been captured by the SPAD array at a timepoint that temporally precedes a timepoint associated with the image frame;
      obtain a dark current factor indicating an amount of dark current associated with the image frame;
      select a dark current image frame, the dark current image frame comprising data indicating one or more SPAD pixels of the plurality of SPAD pixels that detect an avalanche event without detecting a corresponding photon, wherein the dark current image frame is one of a plurality of dark current image frames captured while the SPAD array is covered to prevent photons from reaching the SPAD array, wherein the dark current image frame is selected from the plurality of dark current image frames based on the dark current factor; and
      generate a dark current compensated image by performing a subtraction operation on the temporally filtered image based on the dark current image frame.

2. The system of claim 1, wherein the temporal filtering operation comprises:
   generating at least one aligned preceding image frame by using motion data associated with the SPAD array to spatially align the at least one preceding image frame with the image frame; and
   compositing the image frame with the aligned at least one preceding image frame.

3. The system of claim 1, wherein the temporal filtering operation is based on an optical flow estimation generated based on the at least one preceding image frame and the image frame.

4. The system of claim 1, wherein:
   each of the plurality of dark current image frames is associated with a different temperature or range of temperatures, and
   the dark current factor is based on a runtime temperature detected in association with the capturing of the image frame, such that the selection of the dark current image frame from the plurality of dark current image frames is based on the runtime temperature.

5. The system of claim 4, wherein the instructions are executable by the one or more processors to configure the system to generate an interpolated dark current image frame based on the runtime temperature and at least two dark current image frames of the plurality of dark current image frames, and wherein the dark current image frame used for generating the dark current compensated image comprises the interpolated dark current image frame.

6. The system of claim 1, wherein the plurality of SPAD pixels of the SPAD array comprises a plurality of unexposed SPAD pixels that are covered during the capturing of the dark current image frame and during the capturing of the image frame.

7. The system of claim 6, wherein the dark current factor is based on (i) a quantity of avalanche events detected by the plurality of unexposed SPAD pixels during the capturing of the dark current image frame and (ii) a quantity of avalanche events detected by the plurality of unexposed SPAD pixels during the capturing of the image frame.

8. The system of claim 7, wherein the subtraction operation comprises:
   generating a scaled dark current image frame by modifying the dark current image frame using the dark current factor; and
   subtracting the scaled dark current image frame from the image frame.

9. The system of claim 8, wherein the dark current factor is determined by comparing (i) an average intensity detected by the plurality of unexposed SPAD pixels during the capturing of the dark current image frame and (ii) an average intensity detected by the plurality of unexposed SPAD pixels during the capturing of the image frame.

10. The system of claim 8, wherein:
    the dark current factor comprises a plurality of dark current factor components,
    each dark current factor component is associated with a respective subset of unexposed SPAD pixels of the plurality of unexposed SPAD pixels, and
    generating the scaled dark current image frame comprises using each of the plurality of dark current factor components to modify corresponding regions of the dark current image frame.

11. The system of claim 1, wherein the instructions are executable by the one or more processors to further configure the system to perform a pixel binning operation on the dark current compensated image.

12. The system of claim 1, wherein the instructions are executable by the one or more processors to further configure the system to apply a median filter to the dark current compensated image.

13. A system for compensating for dark current in single photon avalanche diode (SPAD) imagery, the system comprising:
    a SPAD array comprising a plurality of SPAD pixels;
    one or more processors; and
    one or more hardware storage devices storing instructions that are executable by the one or more processors to configure the system to:
       capture an image frame with the SPAD array;
       generate a temporally filtered image by performing a temporal filtering operation based on the image frame and at least one preceding image frame, the at least one preceding image frame having been captured by the SPAD array at a timepoint that temporally precedes a timepoint associated with the image frame;
       obtain a dark current factor indicating an amount of dark current associated with the image frame;
       obtain a dark current image frame, the dark current image frame comprising data indicating one or more SPAD pixels of the plurality of SPAD pixels that detect an avalanche event without detecting a corresponding photon, wherein the dark current image frame is based on one or more image frames captured while the SPAD array is covered to prevent photons from reaching the SPAD array, wherein the plurality of SPAD pixels of the SPAD array comprises a plurality of unexposed SPAD pixels that are covered during the capturing of the dark current image frame and during the capturing of the image frame, wherein the dark current factor is based on (i) a quantity of avalanche events detected by the plurality of unexposed SPAD pixels during the capturing of the dark current image frame and (ii) a quantity of avalanche events detected by the plurality of unexposed SPAD pixels during the capturing of the image frame; and generate a dark current compensated image by performing a subtraction operation on the temporally filtered image based on the dark current image frame and the dark current factor.

14. The system of claim 13, wherein the temporal filtering operation comprises:

generating at least one aligned preceding image frame by using motion data associated with the SPAD array to spatially align the at least one preceding image frame with the image frame; and compositing the image frame with the aligned at least one preceding image frame.

15. The system of claim 13, wherein the temporal filtering operation is based on an optical flow estimation generated based on the at least one preceding image frame and the image frame.

16. The system of claim 13, wherein the subtraction operation comprises:

generating a scaled dark current image frame by modifying the dark current image frame using the dark current factor; and subtracting the scaled dark current image frame from the image frame.

17. The system of claim 16, wherein the dark current factor is determined by comparing (i) an average intensity detected by the plurality of unexposed SPAD pixels during the capturing of the dark current image frame and (ii) an average intensity detected by the plurality of unexposed SPAD pixels during the capturing of the image frame.

18. The system of claim 16, wherein:

the dark current factor comprises a plurality of dark current factor components, each dark current factor component is associated with a respective subset of unexposed SPAD pixels of the plurality of unexposed SPAD pixels, and generating the scaled dark current image frame comprises using each of the plurality of dark current factor components to modify corresponding regions of the dark current image frame.

19. The system of claim 13, wherein the instructions are executable by the one or more processors to further configure the system to perform a pixel binning operation on the dark current compensated image.

20. A method for compensating for dark current in single photon avalanche diode (SPAD) imagery, the method comprising:

capturing an image frame with a SPAD array comprising a plurality of SPAD pixels;

generating a temporally filtered image by performing a temporal filtering operation based on the image frame and at least one preceding image frame, the at least one preceding image frame having been captured by the SPAD array at a timepoint that temporally precedes a timepoint associated with the image frame;

obtaining a dark current factor indicating an amount of dark current associated with the image frame;

selecting a dark current image frame, the dark current image frame comprising data indicating one or more SPAD pixels of the plurality of SPAD pixels that detect an avalanche event without detecting a corresponding photon, wherein the dark current image frame is one of a plurality of dark current image frames captured while the SPAD array is covered to prevent photons from reaching the SPAD array, wherein the dark current image frame is selected from the plurality of dark current image frames based on the dark current factor; and generating a dark current compensated image by performing a subtraction operation on the temporally filtered image based on the dark current image frame.

* * * * *